US010272568B2

(12) United States Patent
Tsuzaki

(10) Patent No.: US 10,272,568 B2
(45) Date of Patent: Apr. 30, 2019

(54) ROBOT APPARATUS, ROBOT CONTROLLING METHOD, PROGRAM, RECORDING MEDIUM, AND ASSEMBLY MANUFACTURING METHOD

(71) Applicant: CANON KABUSHIKI KAISHA, Tokyo (JP)

(72) Inventor: Ryoichi Tsuzaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 80 days.

(21) Appl. No.: 15/258,815

(22) Filed: Sep. 7, 2016

(65) Prior Publication Data

US 2017/0080562 A1     Mar. 23, 2017

(30) Foreign Application Priority Data

Sep. 17, 2015  (JP) ................................ 2015-183957
Sep. 2, 2016   (JP) ................................ 2016-172261

(51) Int. Cl.
*G05B 15/00* (2006.01)
*G05B 19/00* (2006.01)
*B25J 9/16* (2006.01)
*B25J 13/08* (2006.01)

(52) U.S. Cl.
CPC .......... *B25J 9/1633* (2013.01); *B25J 13/085* (2013.01); *G05B 2219/39319* (2013.01); *G05B 2219/39322* (2013.01); *G05B 2219/39529* (2013.01); *G05B 2219/40032* (2013.01); *G05B 2219/40599* (2013.01); *Y10S 901/23* (2013.01)

(58) Field of Classification Search
CPC ................. B25J 13/085; B25J 9/1633; G05B 2219/39319; G05B 2219/39322; G05B 2219/40032; G05B 2219/40599

USPC ....................................................... 700/258
See application file for complete search history.

(56) References Cited

U.S. PATENT DOCUMENTS

| 5,565,749 | A  |   | 10/1996 | Jinno |
| 5,590,244 | A  | * | 12/1996 | Nakata .................. B25J 9/1684 318/578 |
| 2012/0290133 | A1 |   | 11/2012 | Goto |
| 2014/0081460 | A1 |   | 3/2014 | Ando |
| 2014/0156066 | A1 |   | 6/2014 | Sakano |
| 2015/0005923 | A1 | * | 1/2015 | Gu ......................... B24B 49/16 700/164 |

(Continued)

FOREIGN PATENT DOCUMENTS

JP          5371882        12/2013

OTHER PUBLICATIONS

European Search Report dated Feb. 23, 2017 during prosecution of related European application No. 16188894.6.

*Primary Examiner* — Harry Y Oh
(74) *Attorney, Agent, or Firm* — Venable LLP

(57) ABSTRACT

There is provided a robot apparatus which is characterized by comprising: a robot comprising a plurality of motors for driving respective joints and a sensor for obtaining force acting on a hand tip; and a controlling unit for obtaining a torque instruction value for each of the plurality of motors such that a force deviation between the force acting on the hand tip and a force target value becomes small, controlling driving of each of the plurality of motors based on the torque instruction value, and performing a stopping process of decreasing the force target value when a stop order for stopping the robot is received.

11 Claims, 16 Drawing Sheets

(56) References Cited

U.S. PATENT DOCUMENTS

| | | | |
|---|---|---|---|
| 2015/0174760 A1 | 6/2015 | Fukuda | |
| 2016/0089790 A1* | 3/2016 | Wang | B25J 9/1676 |
| | | | 700/255 |
| 2016/0091885 A1* | 3/2016 | Toyoda | G05B 19/19 |
| | | | 700/160 |
| 2017/0007336 A1* | 1/2017 | Tsuboi | B25J 9/1674 |
| 2017/0050317 A1* | 2/2017 | Monreal | B25J 9/1633 |

* cited by examiner

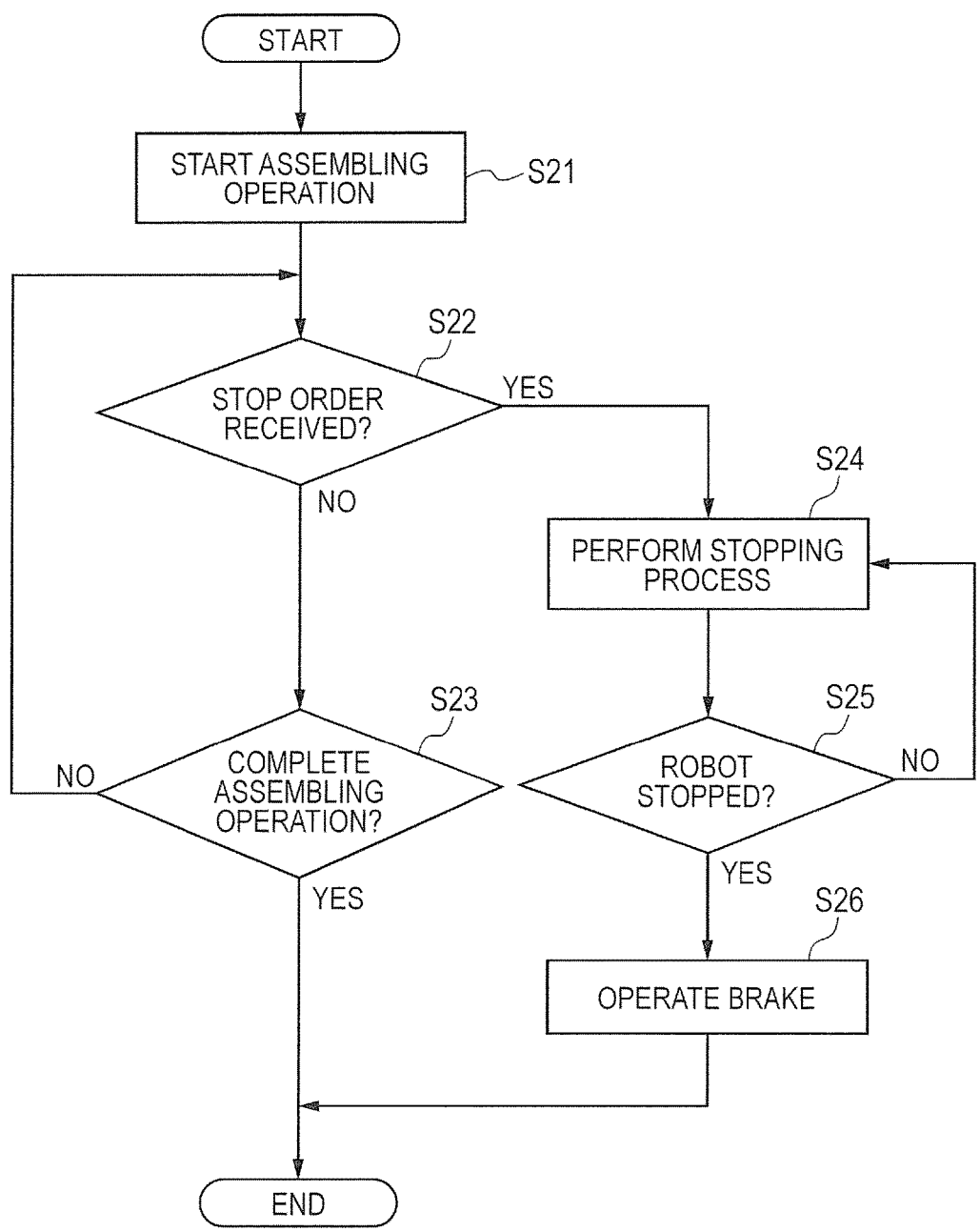

ROBOT APPARATUS, ROBOT CONTROLLING METHOD, PROGRAM, RECORDING MEDIUM, AND ASSEMBLY MANUFACTURING METHOD

BACKGROUND OF THE INVENTION

Field of the Invention

The present invention relates to a robot apparatus which stops a robot when a stop order is received in the middle of force control, a robot controlling method which is performed by the robot apparatus, a program which is used for the robot controlling method, a recording medium which stores or records therein the program, and an assembly manufacturing method in which the robot apparatus is used.

Description of the Related Art

In general, a robot is controlled mainly by either position control or force control. In the position control, when an operation by which the robot comes into contact with a workpiece (work) is performed, a load (burden) is added on the workpiece and/or the robot if there is a position error or the like in the workpiece. Thus, it becomes hard or difficult to perform the operation.

For this reason, position-based force control (admittance control) is performed as the force control. In the position-based force control, a position instruction value by which the robot follows the workpiece is calculated based on the value of a force sensor provided at the tip (end) of the robot. Incidentally, when a stop order is received in the middle of the position-based force control, the force control is switched to the position control, and then the robot is decelerated and stopped (see Japanese Patent No. 5371882).

However, since the position control is used as a minor loop in the position-based force control, responsiveness of the position-based force control is necessarily lower than responsiveness of the position control. In general, a response frequency of the position control is restricted by the natural vibration frequency of the robot. In particular, when the robot is in contact with the workpiece, it is difficult to increase the responsiveness because of a problem of safety.

For this reason, a robot which can achieve high-responsiveness force control is currently developed. More specifically, torque-based force control in which the force control is performed based on a torque instruction value is developed. In the torque-based force control, it is possible to increase the responsiveness without being restricted by the natural vibration frequency of the robot.

However, since the robot has an individual difference which is caused by an error or errors occurred in the process of manufacturing the parts thereof, a positioning error occurs in the robot due to the individual difference. Here, it is difficult to accurately grasp or know the individual difference for each robot. Therefore, when the robot is operated by the position control, the operated robot is resultingly moved to a position which is slightly deviated from a target position.

For this reason, in the high-responsiveness torque-based force control, when the control state is switched from the force control to the position control and then the robot is stopped as described in Japanese Patent No. 5371882, the robot is stopped at the position which is deviated from the target position in the position control due to the individual difference of the robot. Therefore, in a case where the robot is in contact with the workpiece or the workpiece grasped by the robot is in contact with another workpiece, there is a problem that an excessive load is added on both the robot and the workpieces.

Besides, the responsiveness is high in the torque-based force control. Therefore, if a moving speed of the robot is high, it takes time before the robot is decelerated and stopped when a stop order is received. For this reason, there is a possibility that the robot cannot stop at the stop target position and resultingly overshoots it. When the robot overshoots the stop target position, as well as the above, there is a problem that an excessive load is added on the robot and/or the workpiece.

For example, in a case where a mating (fitting) operation such as peg-in-hole is performed using the torque-based force control, if decelerating and stopping the robot by the position control, overshoot occurs because of the position deviation (aberration) due to the individual difference and the high responsiveness. For this reason, there is a case where excessive force is added to the workpiece and thus the workpiece is caught by or hitched on a matching (fitting) hole. Since it is difficult to release or remove the workpiece caught by the matching hole, there is a problem that it takes time before such a troublesome situation is solved. In addition to the matching operation, if the robot is decelerated and stopped by the position control while a pushing operation of pushing the workpiece by certain force is being performed, the workpiece is resultingly pushed by excessive force. Thus, as well as the above, there is a problem that an excessive load is added on the robot and/or the workpiece.

SUMMARY OF THE INVENTION

An object of the present invention is to, when a stop order for stopping a robot is received in the middle of force control, stop the robot with a less load on the robot and a workpiece.

The present invention is directed to a robot apparatus which is characterized by comprising: a robot comprising a plurality of motors configured to drive respective joints, and a sensor configured to obtain force acting on a hand tip; and a controlling unit configured to obtain a torque instruction value for each of the motors such that a force deviation between the force acting on the hand tip and a force target value becomes small, control driving of each of the motors based on the torque instruction value, and perform a stopping process of decreasing the force target value when a stop order for stopping the robot is received.

According to the present invention, when the stop order is received while torque-based force control is being performed, it is possible to stop the robot while reducing the load on the robot and the workpiece.

Further features of the present invention will become apparent from the following description of exemplary embodiments with reference to the attached drawings.

BRIEF DESCRIPTION OF THE DRAWINGS

FIG. 8 is a flow chart for describing an assembly manufacturing method according to the first embodiment.

DESCRIPTION OF THE EMBODIMENTS

Hereinafter, preferred embodiments of the present invention will be exemplarily described in detail in accordance with the accompanying drawings.

[First Embodiment]

Figure 1:
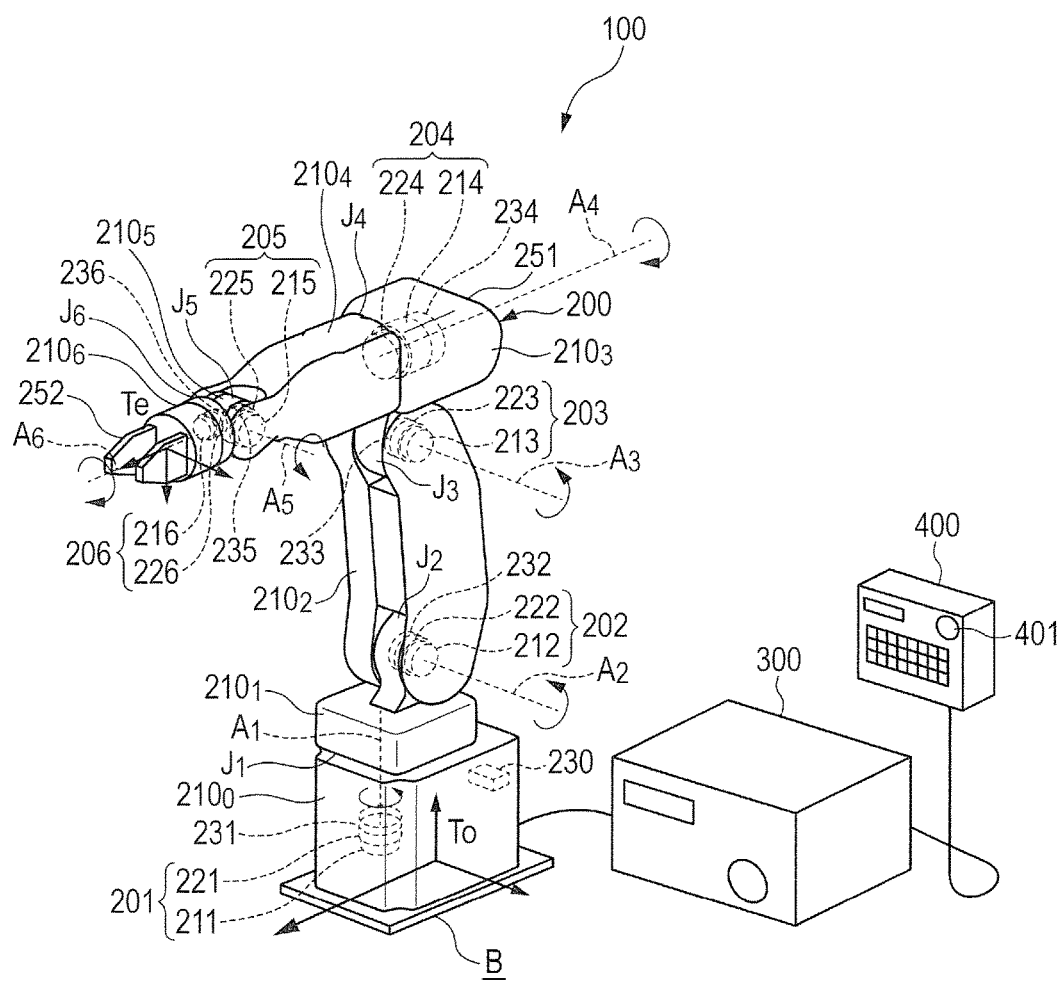
FIG. 1 is a perspective diagram for illustrating a schematic constitution of a robot apparatus according to the first embodiment of the present invention.

FIG. 1 is a perspective diagram for illustrating a schematic constitution of a robot apparatus according to the first embodiment of the present invention. As illustrated in FIG. 1, a robot apparatus 100 comprises a multi-joint robot 200, and a robot controlling device 300 which controls the operation of the robot 200. It should be noted that the robot controlling device 300 is sometimes called a controlling unit in the description of this application. Besides, the robot apparatus 100 comprises a teaching pendant 400 which serves as a teaching device for transmitting teaching data to the robot controlling device 300. The teaching pendant 400 is used by an operator to designate the operations of the robot 200 and the robot controlling device 300.

The robot 200 is a vertical multi-joint robot. More specifically, the robot 200 comprises a vertical multi-joint robot arm 251, and a robot hand 252 which is attached to the tip (end) of the robot arm 251 and serves as an end effector. Hereinafter, a case where the end effector is the robot hand 252 will be described. However, the present invention is not limited to this case. Namely, a tool or the like may be the robot hand. The base end of the robot arm 251 is fixed to a base B. The robot hand 252 is used to grasp (support) an object (a part, a tool, or the like).

The robot 200, i.e., the robot arm 251, has a plurality of joints, e.g., six joints (shafts) $J_1$ to $J_6$. Besides, the robot arm 251 has a plurality (six) of servo motors 201 to 206 for rotatively driving the respective joints $J_1$ to $J_6$ around respective joint axes $A_1$ to $A_6$.

The robot arm 251 has a plurality of links (frames) $210_0$ to $210_6$ which are rotatively connected at the respective joints $J_1$ to $J_6$. Here, the links $210_0$ to $210_6$ are serially connected in order from the base end side to the tip side. The robot arm 251 can turn the hand tip of the robot 200 (i.e., the tip of the robot arm 251) at an arbitrary three-dimensional position toward arbitrary three-direction orientations, within a movable range.

The position and the orientation of the robot arm 251 can be expressed by using coordinate systems. Namely, a coordinate system To indicates the coordinate system which is fixed to the base end of the robot arm 251, i.e., the base B, and, a coordinate system Te indicates the coordinate system which is fixed to the hand tip of the robot 200 (i.e., the tip of the robot arm 251).

In the first embodiment, the hand tip of the robot 200 corresponds to the robot hand 252 when the robot hand 252 does not grasp (support) an object. On the other hand, when the robot hand 252 grasps (supports) an object, the hand tip of the robot 200 corresponds to both the robot hand 252 and the grasped (supported) object (e.g., a part, a tool or the like). Namely, in this case, the hand tip corresponds to the portion beginning from the tip of the robot arm 251, irrespective of whether or not the robot hand 252 grasps (supports) the object.

The servo motors 201 to 206 respectively comprise electric motors (motors) 211 to 216 for respectively driving the joints $J_1$ to $J_6$, and sensor units 221 to 226 respectively connected to the electric motors 211 to 216. The sensor units 221 to 226 respectively comprise position sensors (angle sensors) for detecting the respective positions (angles) of the joints $J_1$ to $J_6$ and torque sensors for detecting respective torques of the joints $J_1$ to $J_6$. Moreover, the servo motors 201 to 206 respectively comprise not-illustrated speed reducers, and the speed reducers are respectively connected to the frames driven by the respective joints $J_1$ to $J_6$ directly or via a not-illustrated transmission member such as a belt, a bearing or the like.

A servo controlling unit 230 which serves as a drive controlling unit for controlling driving of the electric motors 211 to 216 of the respective servo motors 201 to 206 are arranged in the robot arm 251.

The servo controlling unit 230 controls, based on an input torque instruction value corresponding to each of the joints $J_1$ to $J_6$, the driving of each of the electric motors 211 to 216, by outputting an electric current to each of the electric motors 211 to 216 such that the torque of each of the joints $J_1$ to $J_6$ follows the torque instruction value. In the first embodiment, it is described that the servo controlling unit 230 is constituted by one controlling device. However, the servo controlling unit may be constituted by an assembly (aggregate) of a plurality of controlling devices respectively corresponding to the electric motors 211 to 216. Besides, in the first embodiment, the servo controlling unit 230 is disposed inside the robot arm 251. However, the servo controlling unit may by disposed inside the casing of the robot controlling device 300.

Besides, the robot arm 251 of the robot 200 comprises a plurality of brakes (e.g., disk brakes) 231 to 236 for braking the respective joints $J_1$ to $J_6$. It is possible to fix the respective joints $J_1$ to $J_6$ such that the joints $J_1$ to $J_6$ do not move, by operating the respective brakes 231 to 236.

In the first embodiment, the teaching pendant 400 comprises a stop button 401 which serves as a stop operation unit for transmitting a stop order to the robot controlling device 300 in response to an operator's operation.

Figure 2:
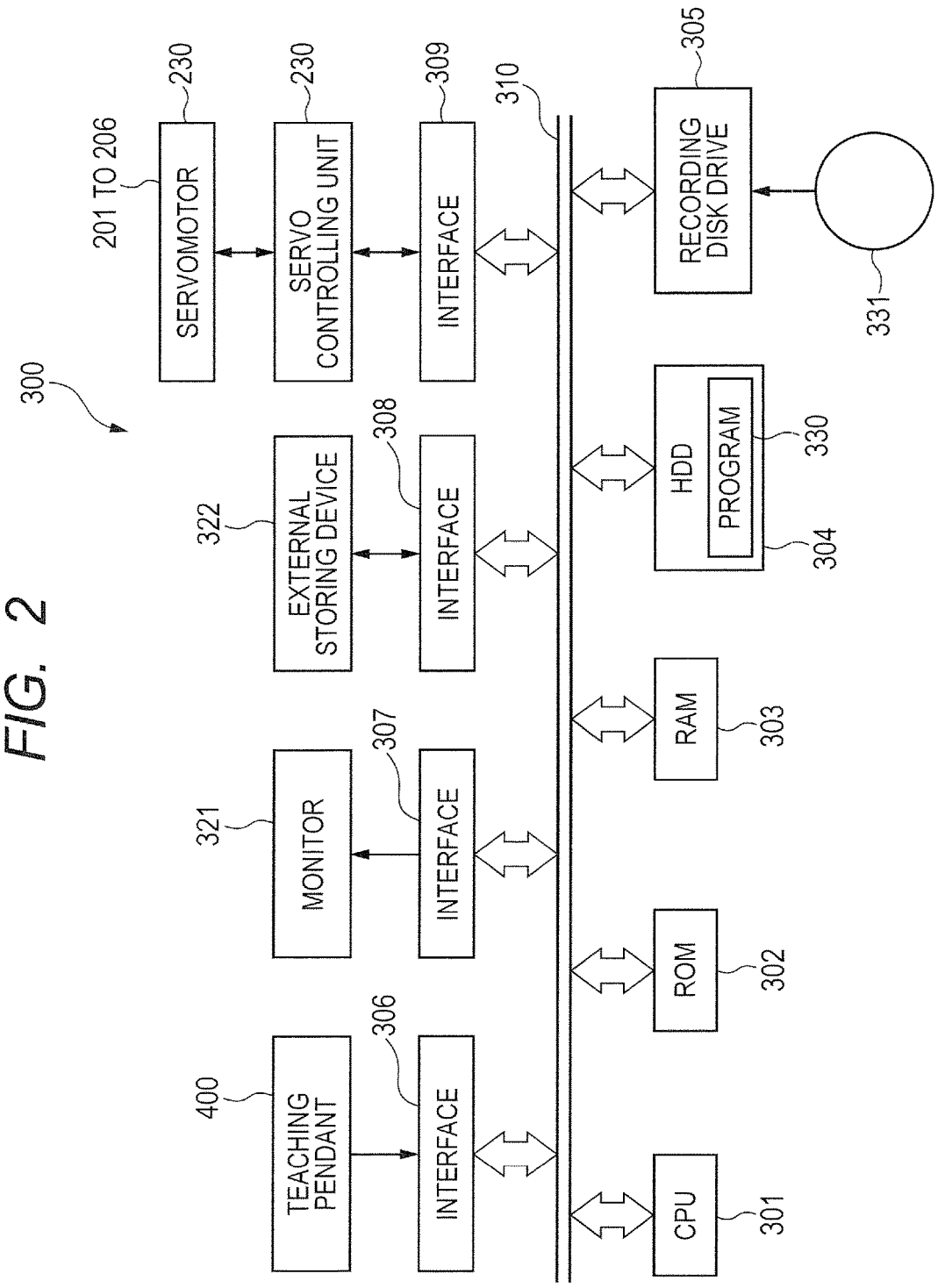
FIG. 2 is a block diagram for illustrating a robot controlling device for the robot apparatus according to the first embodiment.

Next, the robot controlling device 300 will be described. FIG. 2 is a block diagram for illustrating the robot controlling device of the robot apparatus according to the first embodiment. The robot controlling device 300, which is constituted by a computer, comprises a CPU (central processing unit) 301 which serves as a controlling unit (processing unit). Moreover, the robot controlling device 300 comprises an ROM (read only memory) 302, an RAM (random access memory) 303 and an HDD (hard disk drive) 304 which serve as storing units. Moreover, the robot controlling device 300 comprises a recording disk drive 305, and various interfaces 306 to 309.

More specifically, the ROM 302, the RAM 303, the HDD 304, the recording disk drive 305 and the various interfaces 306 to 309 are respectively connected to the CPU 301 via a bus 310. Here, basic programs such as a BIOS (basic input/output system) and the like have been stored in the ROM 302. The RAM 303 is a storing device which temporarily stores therein various data such as arithmetic operation results of the CPU 301, and the like.

The HDD 304 is a storing device which stores therein the arithmetic operation results of the CPU 301, various data obtained externally, and the like. The HDD also stores therein a program 330 to be used to cause the CPU 301 to perform later-described arithmetic operation processes. The CPU 301 performs respective processes in a robot controlling method, on the basis of the program 330 recorded (stored) in the HDD 304.

The recording disk drive 305 can read out various data, programs and the like recorded on a recording disk 331.

The teaching pendant 400 is connected to the interface 306. The CPU 301 receives teaching data input from the teaching pendant 400 via the interface 306 and the bus 310.

The servo controlling unit 230 is connected to the interface 309. The CPU 301 obtains detection results from the respective sensor units 221 to 226 via the servo controlling unit 230, the interface 309 and the bus 310. Besides, the CPU 301 outputs the data indicating the torque instruction value of each of the joints to the servo controlling unit 230 via the bus 310 and the interface 309, at a predetermined time interval.

A monitor 321 is connected to the interface 307. The monitor 321 is used to display various images under the control of the CPU 301. An external storing device 322, which serves as a storing unit such as a rewritable nonvolatile memory, an external HDD or the like, can be connected to the interface 308.

In the first embodiment, the HDD 304 serves as a computer-readable recording medium, and the program 330 is stored in the HDD 304. However, the present invention is not limited to such a constitution. Namely, the program 330 may be recorded on any kind of recording medium if it can be read by a computer. For example, as the recording medium for supplying the program 330, it may be possible to use the ROM 302, the recording disk 331, the external storing device 322 or the like as illustrated in FIG. 2. More specifically, as the recording medium, it is possible to use a flexible disk, a hard disk, an optical disk, a magneto optical disk, a CD-ROM, a CD-R, a magnetic tape, a nonvolatile memory, an ROM or the like.

Figure 3:
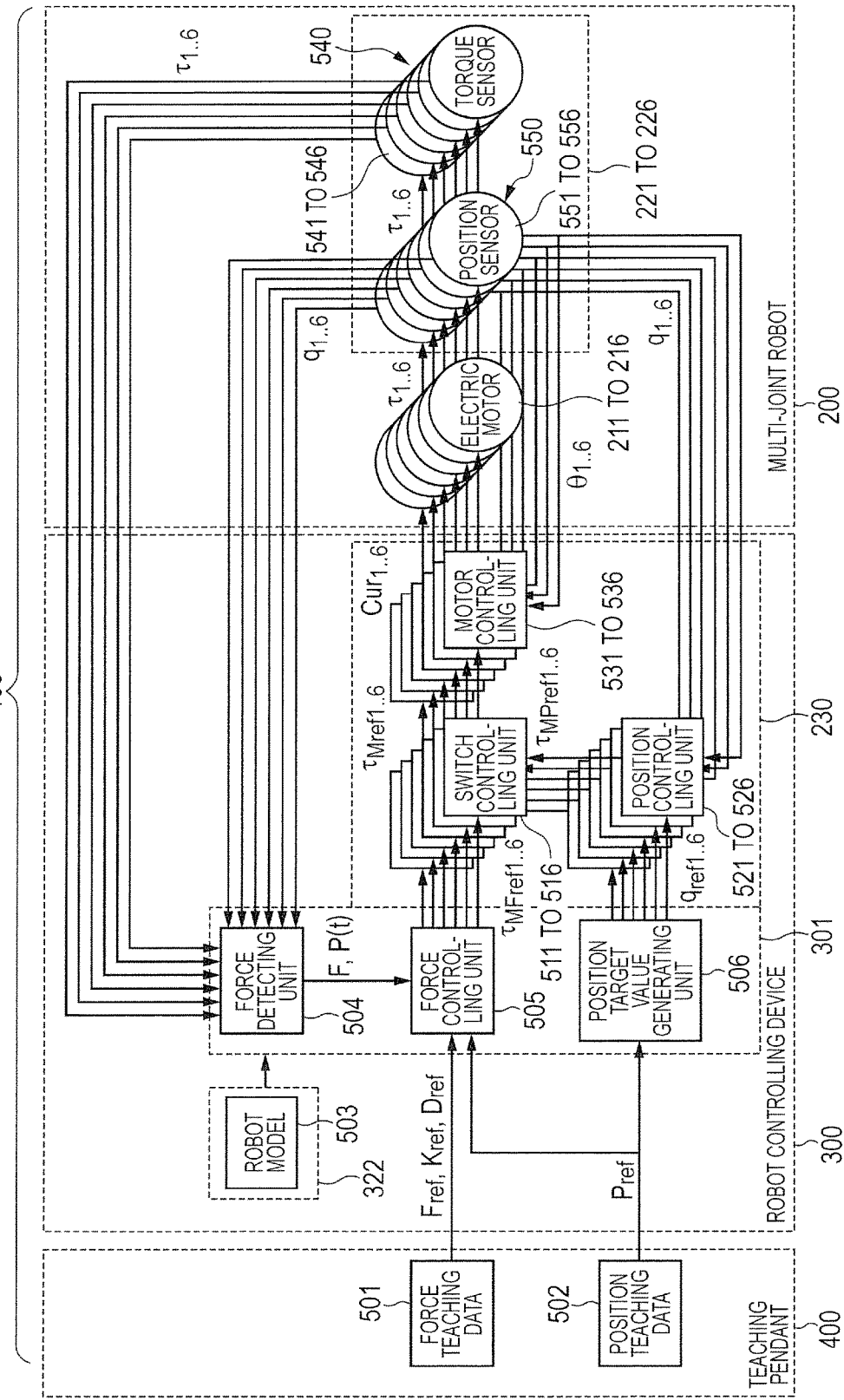
FIG. 3 is a control block diagram for illustrating a control system of the robot apparatus according to the first embodiment.

FIG. 3 is a control block diagram for illustrating the control system of the robot apparatus according to the first embodiment. The CPU 301 of the robot apparatus 300 functions as a force detecting unit 504, a force controlling unit 505 and a position target value generating unit 506, by executing the program 330. The servo controlling unit 230 functions as a plurality of switch controlling units 511 to 516 (i.e., six switch controlling units corresponding to the six joints), a plurality of position controlling units 521 to 526 (i.e., six position controlling units corresponding to the six joints), and a plurality of motor controlling units 531 to 536 (i.e., six motor controlling units corresponding to the six joints).

The sensor units 221 to 226 comprise angle sensors (position sensors) 551 to 556 and torque sensors 541 to 546, respectively. The angle sensors 551 to 556 detect the angles (positions) of the electric motors 211 to 216 or the joints $J_1$ to $J_6$, respectively.

In the first embodiment, the angle sensors 551 to 556 directly detect angles $\theta_1$ to $\theta_6$ of the respective electric motors 211 to 216, respectively. Incidentally, angles $q_1$ to $q_6$ of the respective joints $J_1$ to $J_6$ can be obtained from the angles $\theta_1$ to $\theta_6$ respectively on the basis of a speed reduction ratio of a not-illustrated speed reducer. As a result, the angles sensors 551 to 556 indirectly detect the angles $q_1$ to $q_6$ of the respective joints $J_1$ to $J_6$, respectively.

The torque sensors 541 to 546 detect torques $\tau_1$ to $\tau_6$ of the respective joints $J_1$ to $J_6$, respectively. A position detecting unit 550 for detecting a position P of the hand tip of the robot 200 is constituted by the plurality of angle sensors 551 to 556, and a force detecting unit (torque sensor) 540 for detecting force (hand tip force) F acting on the hand tip of the robot 200 is constituted by the plurality of torque sensors 541 to 546.

The teaching pendant 400 outputs a force target value $F_{ref}$ included in force teaching data 501 and a position target value $P_{ref}$ included in position teaching data 502 to the CPU 301, in response to an operation by an operator. The force target value $F_{ref}$, which is the target value of the hand tip force of the robot 200, is set by the operator with use of the teaching pendant 400. The position target value $P_{ref}$, which is the target value of the hand tip position of the robot 200, is set by the operator with use of the teaching pendant 400. Incidentally, a robot model 503 has been stored in the external storing device 322.

When the stop button 401 is depressed by the operator, the teaching pendant 400 outputs the stop order to the force controlling unit 505 of the CPU 301.

The force detecting unit 504 calculates a current position P(t) of the hand tip of the robot 200 and the hand tip force F of the robot 200 at that time, by using the torques $\tau_1$ to $\tau_6$ respectively detected by the torque sensors 541 to 546 and the angles $q_1$ to $q_6$ respectively detected by the angle sensors 551 to 556.

The force controlling unit 505 inputs the robot model 503 (virtual mass $M_{ref}$), the force target value $F_{ref}$, the position target value $P_{ref}$, a stiffness coefficient $K_{ref}$, a viscosity coefficient $D_{ref}$, the current position P(t) and the force F. Then, the force controlling unit 505 obtains torque instruction values $\tau_{MFref1}$ to $\tau_{MFref6}$ for the respective joints $J_1$ to $J_6$, using the input values. At this time, the force controlling unit obtains the torque instruction values $\tau_{MFref1}$ to $\tau_{MFref6}$ such that a force deviation between the hand tip force F and the force target value $F_{ref}$, a position deviation between the position P(t) of the hand tip and the position target value $P_{ref}$, and a speed deviation between a speed P(t)(•) of the hand tip and a speed target value $P_{ref}$(•) become small respectively. The force controlling unit 505 outputs the obtained torque instruction values $\tau_{MFref1}$ to $\tau_{MFref6}$ to the switch controlling units 511 to 516, respectively. Here, the speed P(t)(•) is obtained by differentiating the position P(t) with respect to time, and the speed target value $P_{ref}$(•) is obtained by differentiating the position target value $P_{ref}$ with respect to time. Therefore, in the first embodiment, the force controlling unit 505 obtains the speed P(t)(•) of the hand tip from the position P(t) of the hand tip being the detection result of the position detecting unit 550. Incidentally, it may be possible for the position detecting unit 550 to output the data itself of the speed P(t)(•) of the hand tip by the arithmetic operation. In should be noted that, in this case, the position detecting unit 550 also serves as a speed detecting unit for detecting the speed of the hand tip. Incidentally, the symbol (•) indicates one (single) differentiation to be performed with respect to time.

The position target value generating unit 506 obtains angle instruction values (position instruction values) $q_{ref1}$ to $q_{ref6}$ of the respective joints $J_1$ to $J_6$ from the position target value $P_{ref}$ of the hand tip by inverse kinematics calculation, and outputs the obtained angle instruction values $q_{ref1}$ to $q_{ref6}$ to the position controlling units 521 to 526, respectively.

The position controlling units 521 to 526 respectively obtain torque instruction values $\tau_{MPref1}$ to $\tau_{MPref6}$ such that angle deviations between the angles $q_1$ to $q_6$ of the respective joints $J_1$ to $J_6$ and the angle instruction values $q_{ref1}$ to $q_{ref6}$ of the respective joints $J_1$ to $J_6$ become small, respectively. Incidentally, to reduce the angle deviations is equivalent to reduce the angle deviations between the angles of the respective electric motors 211 to 216 and the angle instruction values obtained by converting the angle instruction values $q_{ref1}$ to $q_{ref6}$ with the speed reduction ratio or the like of the speed reducer. The position controlling units 521 to 526 output the torque instruction values $\tau_{MPref1}$ to $\tau_{MPref6}$ to the switch controlling units 511 to 516, respectively.

The switch controlling units 511 to 516 perform switch control between a force control mode of performing the torque-based force control and a position control mode of performing the position-based force control. In the force control mode, the switch controlling units 511 to 516 output the torque instruction values $\tau_{MFref1}$ to $\tau_{MFref6}$ as torque instruction values $\tau_{Mref1}$ to $\tau_{Mref6}$ to the motor controlling units 531 to 536, respectively. Moreover, in the position control mode, the switch controlling units 511 to 516 output the torque instruction values $\tau_{MPref1}$ to $\tau_{MPref6}$ as the torque instruction values $\tau_{Mref1}$ to $\tau_{Mref6}$ to the motor controlling units 531 to 536, respectively.

The motor controlling units 531 to 536 energize the electric motors 211 to 216 by respective currents $Cur_1$ to $Cur_6$ to achieve the torque instruction values $\tau_{Mref1}$ to $\tau_{Mref6}$, based on the angles (positions) $\theta_1$ to $\theta_6$ of the respective electric motors 211 to 216.

Figure 4:
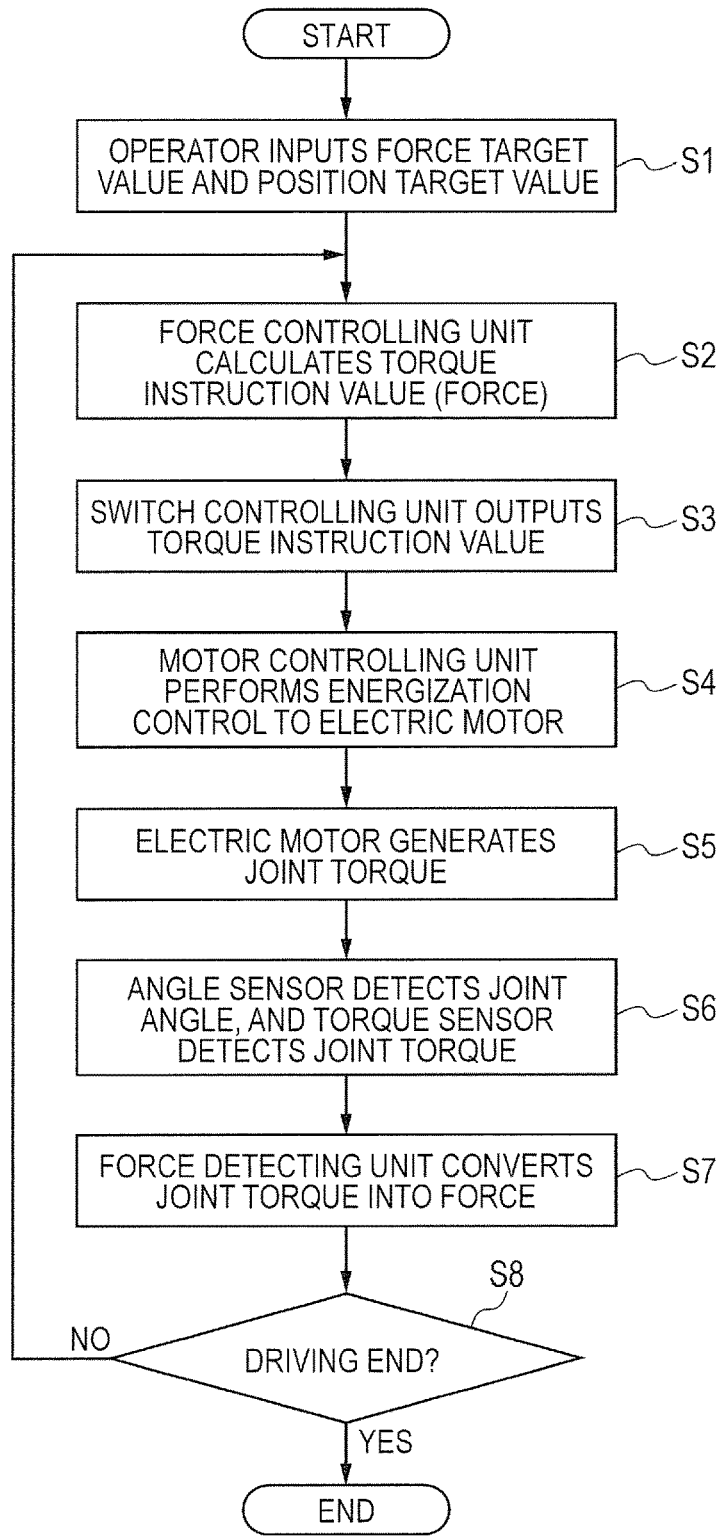
FIG. 4 is a flow chart for describing force control of a robot in the first embodiment.

Next, the force control of the robot 200 will be described. FIG. 4 is a flow chart for describing the force control to be performed to the robot 200 in the first embodiment.

Initially, the operator inputs the force target value $F_{ref}$ and the position target value $P_{ref}$ to the teaching pendant 400 (S1). Thus, the force target value $F_{ref}$ is stored to the force teaching data 501, and the position target value $P_{ref}$ is stored to the position teaching data 502. Here, the position target value $P_{ref}$ corresponds to the position at which the force control operation is started.

The force controlling unit 505 calculates the torque instruction values (force) $\tau_{Mref1}$ to $\tau_{Mref6}$ to the respective motors 211 to 216 by using the robot model 503 such that the hand tip force F follows the force target value $F_{ref}$; that is, the deviation between the hand tip force F and the force target value $F_{ref}$ becomes small (S2).

The switch controlling units 511 to 516 output the torque instruction values (force) $\tau_{MFref1}$ to $\tau_{MFref6}$ as the torque instruction values $\tau_{Mref1}$ to $\tau_{Mref6}$ to the motor controlling units 531 to 536, respectively (S3).

The motor controlling units 531 to 536 perform energization control to achieve the respective torque instruction values $\tau_{Mref1}$ to $\tau_{Mref6}$ based on the angles $\theta_1$ to $\theta_6$ of the respective electric motors 211 to 216 (S4).

The electric motors 211 to 216 respectively generate the joint torques $\tau_1$ to $\tau_6$ based on energization (S5).

The angle sensors 551 to 556 detect the angles $q_1$ to $q_6$ of the respective joints $J_1$ to $J_6$ (i.e., the angles $\theta_1$ to $\theta_6$ of the respective electric motors 211 to 216). The torque sensors 541 to 546 respectively detect the torques $\tau_1$ to $\tau_6$ of the respective joints $J_1$ to $J_6$ (S6). The angles $q_1$ to $q_6$ of the respective joints $J_1$ to $J_6$ and the torques $\tau_1$ to $\tau_6$ of the respective joints $J_1$ to $J_6$ are respectively fed back to the CPU 301 of the robot controlling device 300.

The force detecting unit 504 (i.e., the CPU 301) converts the torques $\tau_1$ to $\tau_6$ of the respective joints $J_1$ to $J_6$ into the hand tip force F acting on the hand tip of the robot 200 at the current position P(t), based on the robot model 503 and the angles $q_1$ to $q_6$ of the respective joints $J_1$ to $J_6$ (S7). Incidentally, it may be possible to use the angles $\theta_1$ to $\theta_6$ of the respective electric motors 211 to 216, instead of the angles $q_1$ to $q_6$ of the respective joints $J_1$ to $J_6$.

The CPU 301 decides whether or not the driving ends (S8). When the driving does not end (S8: NO), the CPU repeatedly performs the processes in S2 to S7. By driving the respective electric motors 211 to 216 according to the process indicated by the above flow chart, it is possible to control the force F acting on the hand tip of the robot 200 to the desired force target value $F_{ref}$. Incidentally, the order of the processes is not limited to that described in the flow chart of FIG. 4. Namely, it is possible to achieve the force control in another order.

Figure 5:
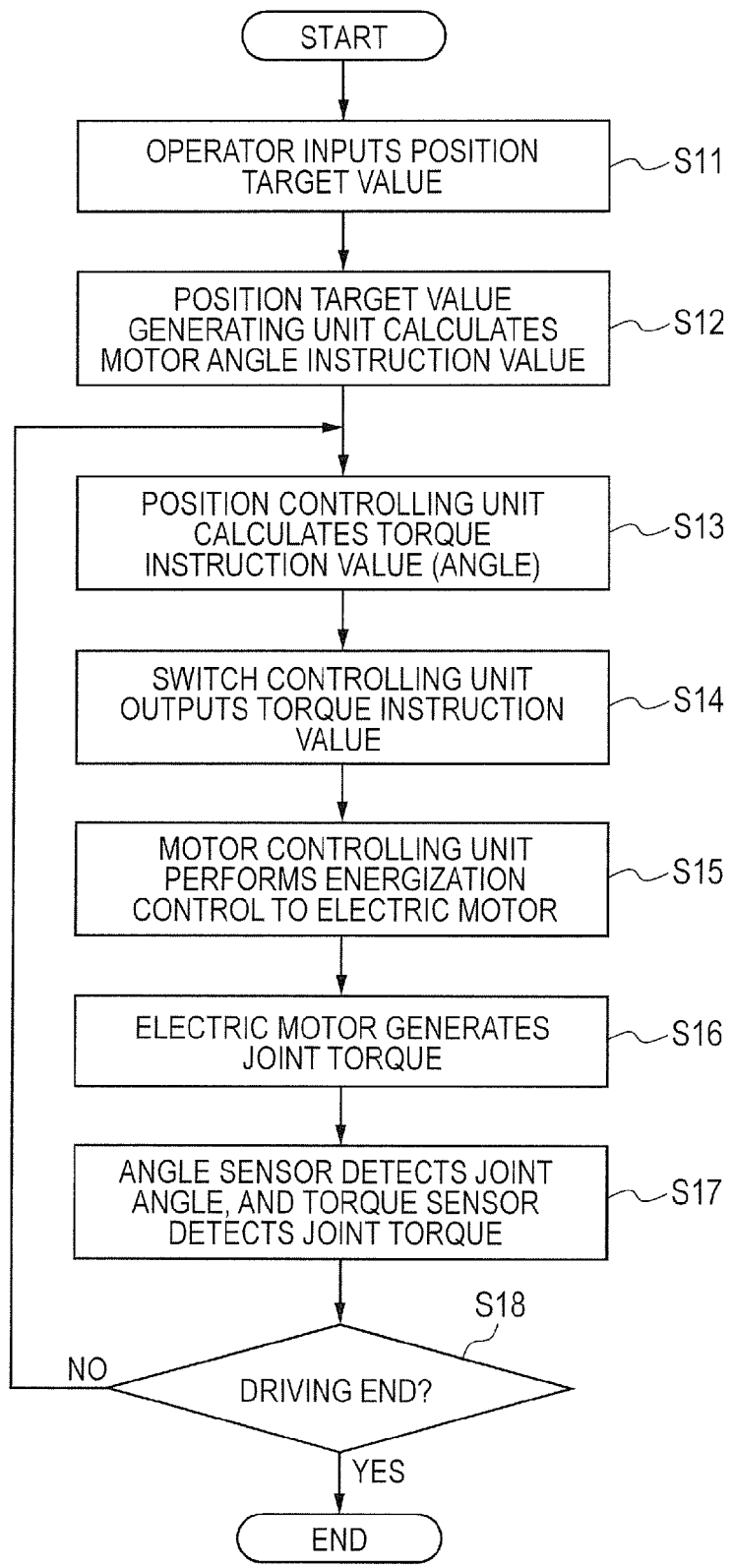
FIG. 5 is a flow chart for describing position control of the robot in the first embodiment.

Subsequently, the position control of the robot 200 will be described. FIG. 5 is a flow chart for describing the position control to be performed to the robot 200 in the first embodiment.

Initially, the operator inputs the position target value $P_{ref}$ to the teaching pendant 400 (S11). The position target value $P_{ref}$ is stored in the position teaching data 502.

The position target value generating unit 506 converts the position target value $P_{ref}$ into the angle instruction values $q_{ref1}$ to $q_{ref6}$ of the respective joints $J_1$ to $J_6$, based on the robot model 503 (S12).

The position controlling units 521 to 526 calculate the torque instruction values (angles) $\tau_{MPref1}$ to $\tau_{MPref6}$ of the respective electric motors 211 to 216 such that the angles $q_1$ to $q_6$ of the respective joints $J_1$ to $J_6$ follow the angle instruction values a $q_{ref1}$ to $q_{ref6}$ of the respective joints $J_1$ to $J_6$ (S13). Here, as signals indicating the angles of the respective joints $J_1$ to $J_6$, it is may be possible to use the angles $\theta_1$ to $\theta_6$ of the respective electric motors 211 to 216, instead of the angles $q_1$ to $q_6$.

The switch controlling units 511 to 516 output the torque instruction values (angles) $\tau_{MPref1}$ to $\tau_{MPref6}$ as the torque instruction values $\tau_{Mref1}$ to $\tau_{Mref6}$ to the motor controlling units 531 to 536, respectively (S14).

Incidentally, since the processes to be performed in S15, S16, S17 and S18 are respectively the same as those to be performed in S4, S5, S6 and S8, the descriptions thereof are omitted. It is possible, by driving the respective electric motors 211 to 216 according to the process indicated by the above flow chart, to control the hand tip position P of the robot 200 so as to follow the desired position target value $P_{ref}$.

The force control by the processes in S1 to S8 and the position control by the processes in S11 to S18 are switched by the switch controlling units 511 to 516. Thus, either one of the force control and the position control is selected according to the content of the operation or work.

Figure 6:
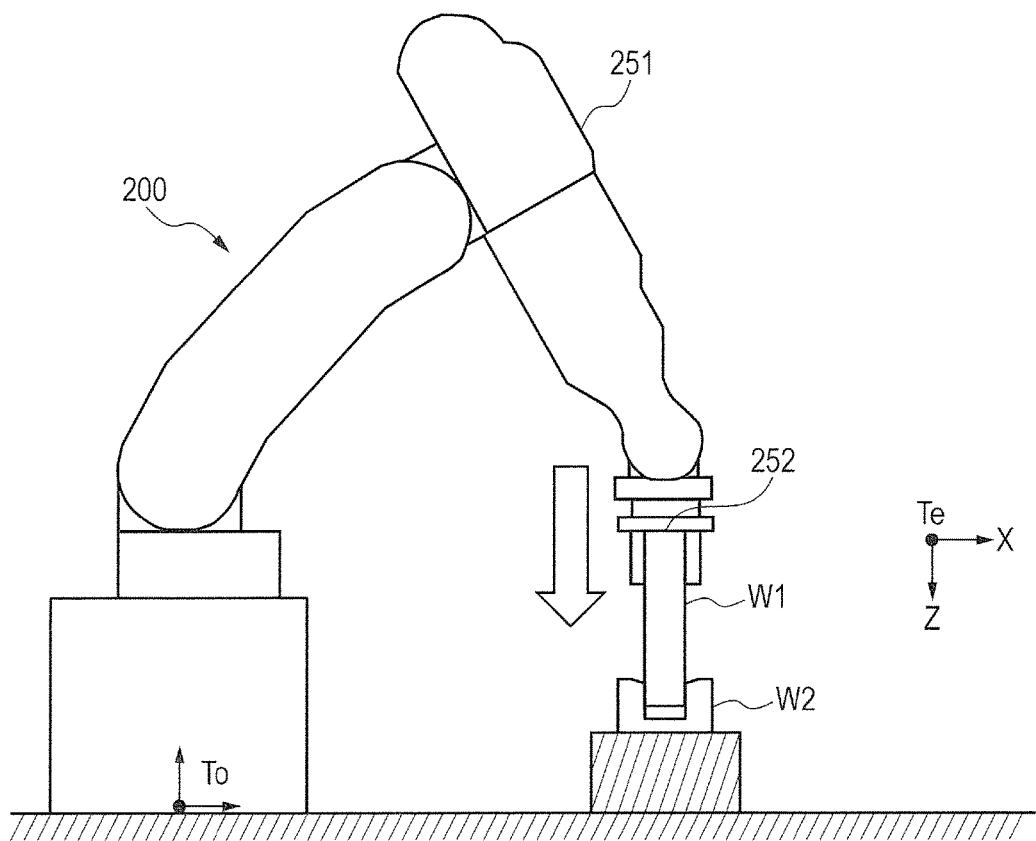
FIG. 6 is a schematic diagram for illustrating a state of an assembling operation being performed by the robot according to the first embodiment.

FIG. 6 is a schematic diagram for illustrating the state that an assembling operation is performed by the robot according to the first embodiment. In the first embodiment, the robot hand 252 is moved downward by the torque-based force control, to perform the assembling operation (fitting operation) of assembling (fitting) a cylindrical workpiece W1 being a first part supported (grasped) by the robot hand 252 to a circular workpiece W2 being a second part.

Figure 7:
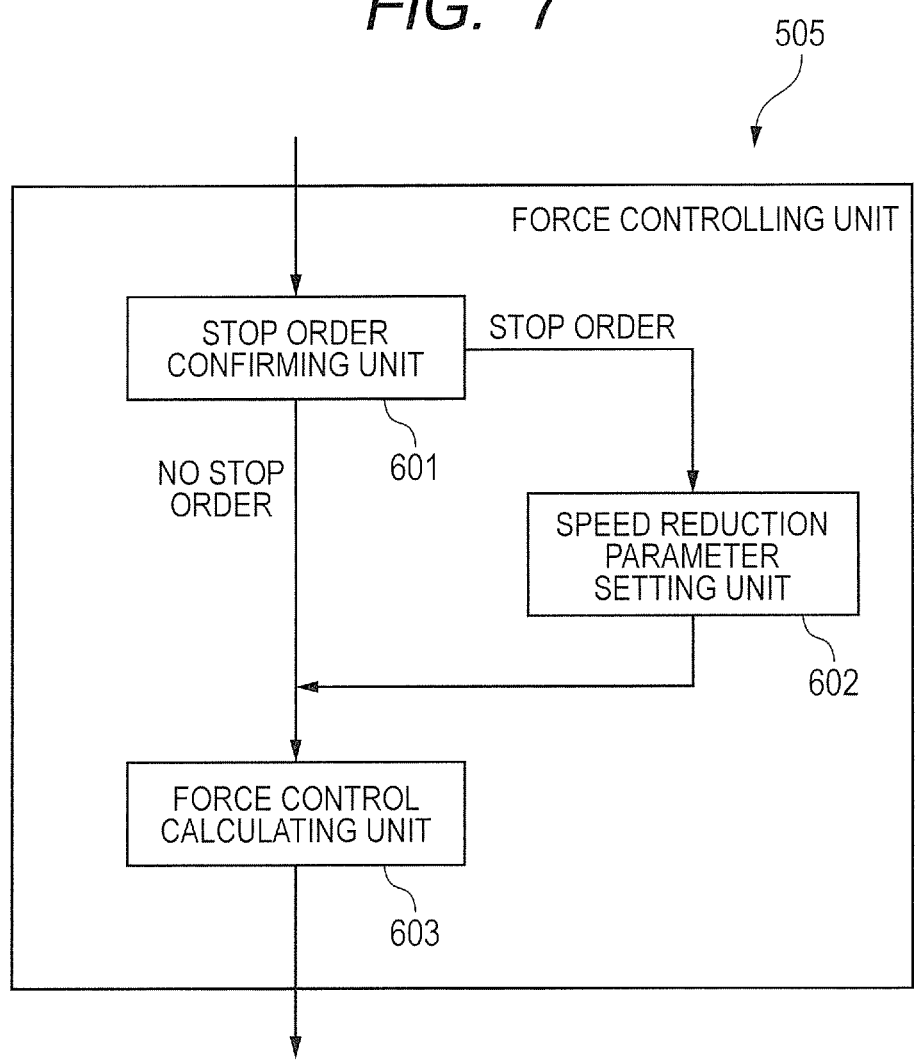
FIG. 7 is a block diagram for illustrating the detail of the force controlling unit illustrated in FIG. 3.

FIG. 7 is a block diagram for illustrating the detail of the force controlling unit 505 illustrated in FIG. 3. FIG. 8 is a flow chart for describing a manufacturing method of an assembly according to the first embodiment. The force controlling unit 505 comprises a stop order confirming unit 601, a speed reduction parameter setting unit 602 and a force control calculating unit 603.

Initially, the force controlling unit 505 starts the assembling operation (S21).

In the assembling operation, the stop order confirming unit 601 decides whether or not a stop order for stopping the robot 200 is received, that is, whether or not the stop button 401 is depressed (S22: deciding process, deciding step). For example, when the CPU 301 decides that it is necessary to stop a device due to some kind or another abnormality occurs in the device, the stop order is issued via the teaching pendant 400 of FIG. 1. Besides, it may be possible to previously write the stop order in the robot program for defining the operation of the robot 200, so that the robot 200 may be stopped based on the robot program.

The force control calculating unit 603 performs calculations by the equations (1) and (2), based on following variations.

given position target value: $P_{ref}$
given force target value: $F_{ref}$
given stiffness coefficient: $K_{ref}$
given viscosity coefficient: $D_{ref}$
inertia matrix included in robot model: $\Lambda_{ref}$
current position: $P(t)$
force: $F$
Jacobian determinant calculated from robot model and joint speed $q(\cdot)$: $J(q)$
inertia matrix calculated by inverse dynamics calculation: $M(q)$
Coriolis centrifugal matrix calculated by inverse dynamics calculation: $c(q, q(\cdot))$
gravity vector calculated by inverse dynamics calculation: $g(q)$
matrix calculated from $J(q)$, $M(q)$ and current position $P(t)$: $\Lambda(P(t))$ $$\tau_{MFref} = g(q) + J(q)^T(\Lambda(P(t))\dot{P}_{ref} + \mu(P(t), \dot{P}(t))\dot{P}(t)) - \\ J(q)^T\Lambda(P(t))\Lambda_{ref}^{-1}(K_{ref}(P(t) - P_{ref}) + D_{ref}(\dot{P}(t) - \dot{P}_{ref}) + F_{ref}) + \\ J(q)^T(\Lambda(P(t))\Lambda_{ref}^{-1} - 1)F \quad (1)$$

$$\mu(P(t),\dot{P}(t)) = J(q)^{-T}(c(q,\dot{q}) - M(q)J(q)^{-1}\dot{J}(q))J(q)^{-1} \quad (2)$$

Incidentally, the expression (1) is merely an example of the force control. Namely, the force control according to the present invention is not limited to this expression.

When the stop order confirming unit 601 decides that the stop order is not received (S22: NO), the force control calculating unit 603 calculates the torque instruction values $\tau_{MFref1}$ to $\tau_{MFref6}$ to be output to the respective switch controlling units 511 to 516 of FIG. 3, from the expression (1). Then, the force control calculating unit 603 decides whether or not the assembling operation is completed (S23). When the assembling operation is completed (S23: YES), the process ends immediately. On the other hand, when the assembling operation is not yet completed (S23: NO), the process returns to S22.

When the stop order confirming unit 601 decides that the stop order for stopping the robot 200 is received (S22: YES), the speed reduction parameter setting unit 602 decreases the force target value $F_{ref}$ when stopping the robot 200 (S24: stopping process, stopping step). More specifically, the speed reduction parameter setting unit 602 decreases, from a time $t_{triger}$ at which the stop order is received, the force target value $F_{ref}$ to 0 within a previously set stop target time. That is, the force target value $F_{ref}$ is equivalent to the member (term) which depends on time such as $F_{ref} = F(t)$ after the time $t_{triger}$ of the stop order. Then, the force control calculating unit 603 calculates the torque instruction values $\tau_{MFref1}$ to $\tau_{MFref6}$ to be output to the respective switch controlling units 511 to 516 of FIG. 3, from the expression (1).

Figure 9A:
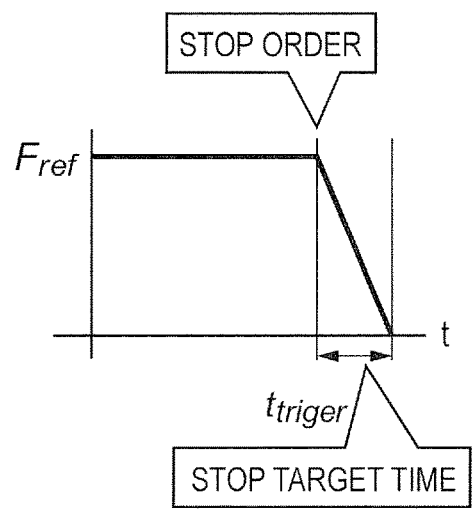
FIGS. 9A, 9B and 9C are graphs respectively indicating force target values to time.
Figure 9B:
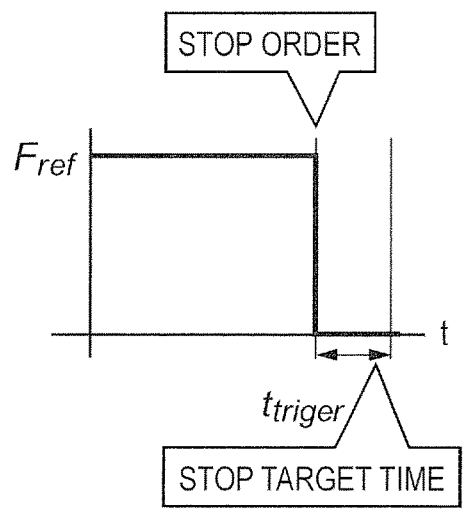
Figure 9C:
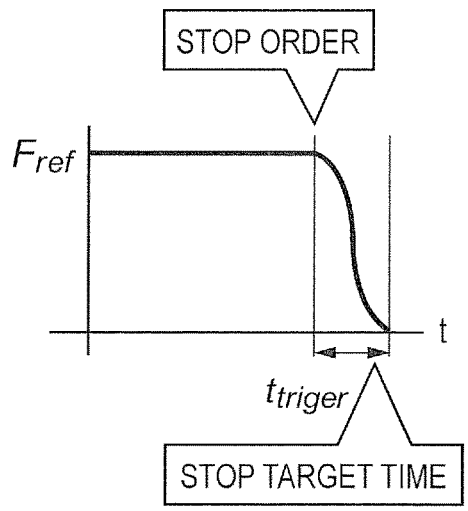

Some kinds of decreasing methods are conceivable according to purposes. FIGS. 9A to 9C are graphs respectively indicating the force target values to time. More specifically, FIG. 9A is the graph indicating the force target value $F_{ref}$ linearly decreased to time from the time $t_{triger}$ at which the stop order was received, FIG. 9B is the graph indicating the force target value $F_{ref}$ decreased stepwise to time from the time $t_{triger}$ at which the stop order was received, and FIG. 9C is the graph indicating the force target value $F_{ref}$ nonlinearly decreased to time from the time $t_{triger}$ at which the stop order was received. Although the force target value $F_{ref}$ is the vector which consists of translation XYZ and rotation XYZ, only one direction is illustrated in FIGS. 9A to 9C for the purpose of simplification.

The force target value $F_{ref}$ shown in each of FIGS. 9A to 9C is monotonously decreased to time. More specifically, the force target value $F_{ref}$ shown in FIG. 9A is linearly decreased. The force target value $F_{ref}$ shown in FIG. 9B is instantaneously switched to "0" at the time $t_{triger}$ of the stop order, and this value is used when the operator wishes to reduce speed earlier than the case where the force target value $F_{ref}$ shown in FIG. 9A is used. For example, this value can be used when the speed at the time of the stop order is slow (low), or when the operator wishes to stop the robot as soon as possible in the state that the workpiece W1 is not in contact with the workpiece W2. The force target value $F_{ref}$ shown in FIG. 9C is nonlinearly decreased, and this value can be used when making the movements at the time of speed reduction start and at the time of stop completion smooth as compared with the case shown in FIG. 9A. For example, this value can be used when the operator wishes to stop the robot without adding a load on the workpiece W1. Incidentally, the shown methods of decreasing the force target value are merely examples, and the present invention is not limited to these methods. Besides, although the case of decreasing the force target value $F_{ref}$ to 0 is described in the present embodiment, the present invention is not limited to this. For example, it may be possible to decrease the force target value $F_{ref}$ to a value close to 0.

According to the first embodiment, in the case where the stop order for stopping the robot 200 is received while the torque-based force control is being performed, the CPU 301 can stop the robot 200 while reducing the load added to the robot 200 and the workpieces W1 and W2.

Further, in S24, the speed reduction parameter setting unit 602 fixes (or holds) the position target value $P_{ref}$ being he control target of the force control to the value $P(t_{triger})$ of the current position after the time $t_{triger}$ at which the stop order was received. That is, the speed reduction parameter setting unit 602 sets the position target value $P_{ref}$ in case of obtaining the torque instruction values $\tau_{MFref1}$ to $\tau_{MFref6}$ to the fixed value $(t_{triger})(P_{ref}=P(t_{triger}))$.

Figure 10:
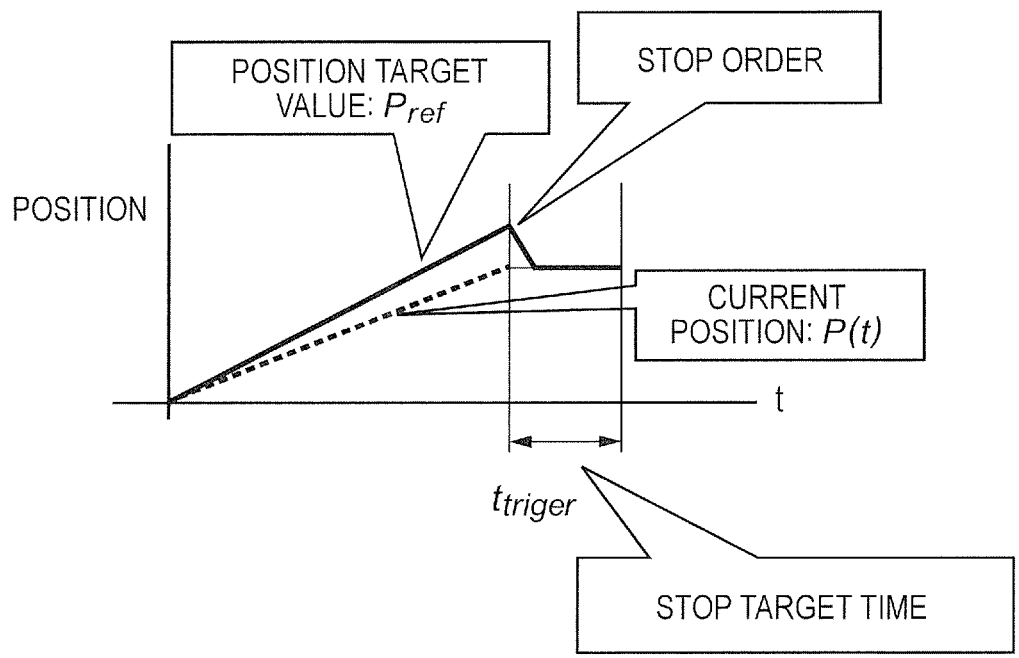
FIG. 10 is a graph indicating a position of a hand tip and a position target value to time.

FIG. 10 is a graph indicating the position of the hand tip to time and the position target value. Although the position target value $P_{ref}$ is the vector which consists of translation XYZ and rotation XYZ, only one direction is illustrated in FIG. 10 for the purpose of simplification. As illustrated in FIG. 10, the position deviation between the position target value $P_{ref}$ and the actual position P exists at the instant when the stop order is received. However, the position deviation becomes small extremely by setting the position target value $P_{ref}$ to the fixed value $P(t_{triger})$ immediately after the stop order was received. The force control calculating unit 603 calculates the torque instruction values $\tau_{MFref1}$ to $\tau_{MFref6}$ by using such a changed parameter.

According to the first embodiment, by decreasing the force target value $F_{ref}$ and further setting the position target value $P_{ref}$ to the fixed value, it is possible to stop the robot 200 in the state that the position of the hand tip of the robot 200 is fixed, while reducing the load added to the robot 200 and the workpiece.

Next, in FIG. 8, the CPU 301 decides whether or not the robot 200 is stopped in S24 (S25: stop deciding process, stop deciding step). Here, it is decided whether or not the robot 200 is stopped, on the basis of decision as to whether or not the current speed $P(t)(\bullet)$ calculated from the current position $P(t)$ is within a preset threshold. That is, when the speed $P(\bullet)$ of the hand tip is held within the threshold, it is decided that the robot 200 is stopped.

When it is decided in S25 that the robot 200 is stopped (S25: YES), the CPU 301 operates the respective brakes 231 to 236 to fix the respective joints $J_1$ to $J_6$ of the robot 200 (S26: fixing process, fixing step). In this case, the motor controlling units 531 to 536 stop power supply to the motors 211 to 216, respectively. Thus, even if external force acts on the robot 200 and the workpiece W1 after the robot 200 was stopped, the robot 200 does not move.

Figure 11A:
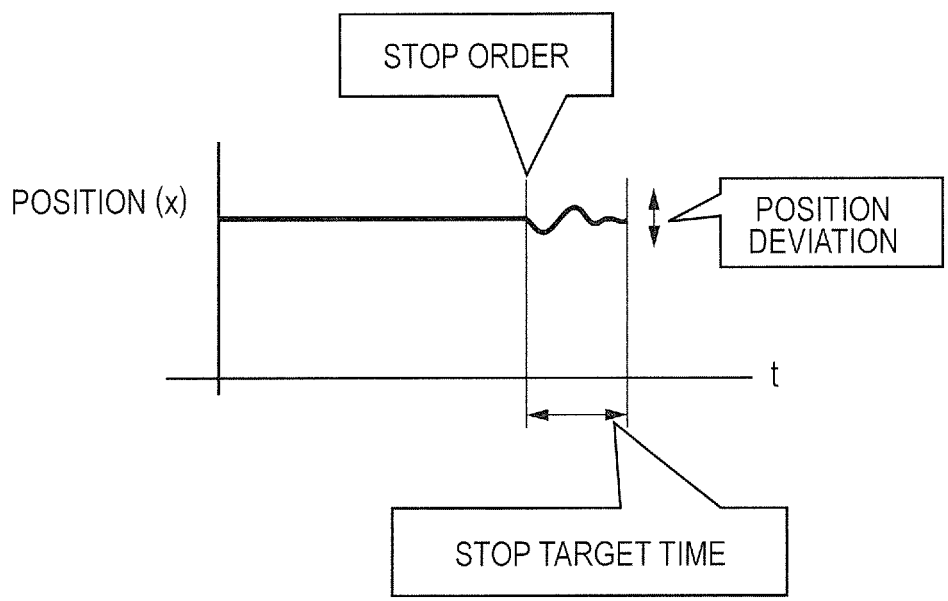
FIG. 11A is a graph indicating displacement of a robot hand in a case where a stopping process is performed while torque-based force control is maintained.

FIG. 11A is a graph indicating displacement of the robot hand 252 in the X direction (i.e., the horizontal direction in regard to the base of the robot hand) in case of performing the stopping process while maintaining the torque-based force control. The graph illustrated in FIG. 11A corresponds to the experimental result obtained in the first embodiment. In this case, since the robot 200 is decelerated and stopped with the force control maintained, the position deviation of the hand tip is small. In particular, since the position target value $P_{ref}$ is fixed to the value of the current position (see FIG. 10) at the time when the stop order was received, it is possible to effectively restrain the hand tip from shifting or fluctuating from the time of the reception of the stop order.

Figure 11B:
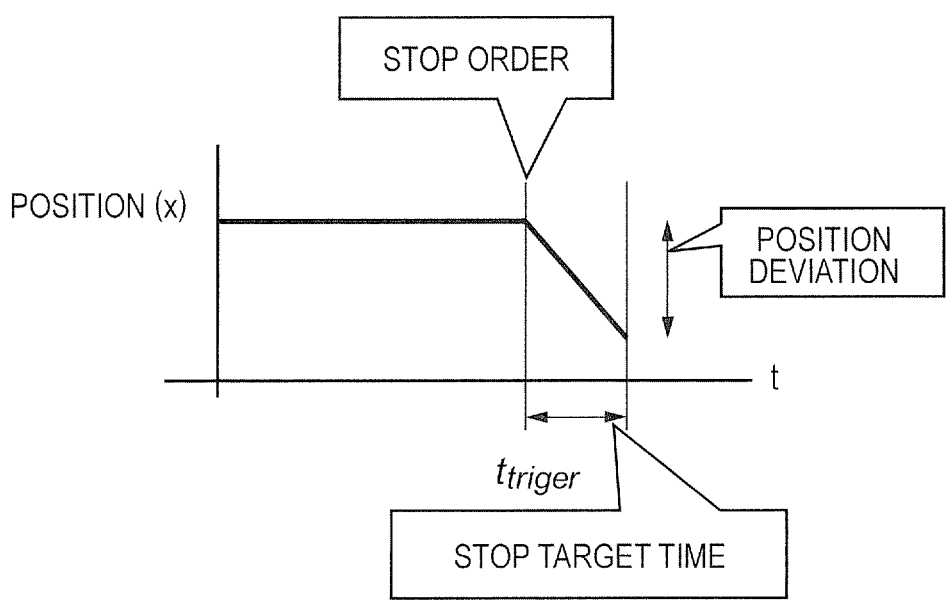
FIG. 11B is a graph indicating displacement of the robot hand in a case where the stopping process is performed while the torque-based force control is switched to position control.

FIG. 11B is a graph indicating displacement of the robot hand 252 in the X direction in case of performing the stopping process by switching the torque-based force control to the position control. The graph illustrated in FIG. 11B corresponds to the experimental result obtained in a comparative example. In this case, a position deviation (aberration) of the robot hand 252 caused due to the individual difference of the robot 200 is large and the speed of the hand tip of the robot 200 is high. For this reason, if the position target value $P_{ref}$ is fixed to the value (see FIG. 10) at the time when the stop order was received, the hand tip overshoots the position at which the stop order was received. Thus, the position deviation becomes large after the stop order.

According to the first embodiment, when the stop order is received in the middle of the force control, the robot 200 stops after the workpiece W2 which is being in contact with the robot, because the force target value is decreased and the position target value is fixed to the current position at the time of the reception of the stop order. For this reason, it is possible to stably stop the robot 200 while maintaining the force control.

Besides, in a case where the position deviation of the hand tip of the robot 200 is small and the workpiece is made by a soft material, it is possible to prevent destruction of the workpiece. Moreover, in a case where the workpiece is made by a hard material, it is possible to prevent destruction of the robot 200 caused due to an overload added to the robot 200. In addition, according to the present embodiment, since the workpieces to be handled are not mutually caught (or seized) each other, it is possible to easily return or restore the operation of the robot after the robot was once stopped.

[Second Embodiment]

Subsequently, the robot apparatus according to the second embodiment of the present invention will be described in detail. In the first embodiment, in the stopping process of stopping the robot, the position target value $P_{ref}$ is fixed. However, in the second embodiment, in the stopping process of stopping the robot, the speed target value $P_{ref}(\bullet)$ is decreased. Here, the constitution of the robot apparatus in the second embodiment is the same as that in the first embodiment. In the robot controlling method (assembly manufacturing method) according to the second embodiment, a part of the process to be performed by the CPU 310 (concretely, the process to be performed by the speed reduction parameter setting unit 602 illustrated in FIG. 7) is different from the process described in the first embodiment. Therefore, only the process to be performed by the speed reduction parameter setting unit 602 will be described hereinafter.

In the second embodiment, the speed reduction parameter setting unit 602 decreases the force target value $F_{ref}$ and the speed target value $P_{ref}(\bullet)$ after the time $t_{triger}$ at which the stop order was received. That is, the speed target value $P_{ref}(\bullet)$ is equivalent to the member (term) which depends on time such as $P_{ref}(\bullet)=P(t)(\bullet)$ after the time $t_{triger}$ at which the stop order was received.

As compared with the first embodiment, the operation descry bed in the second embodiment is effective in a case where an actual hand tip speed at the time when the stop order is received by the CPU 301 is high. Incidentally, the method of decreasing the force target value $F_{ref}$ is the same as that in the first embodiment.

Figure 12A:
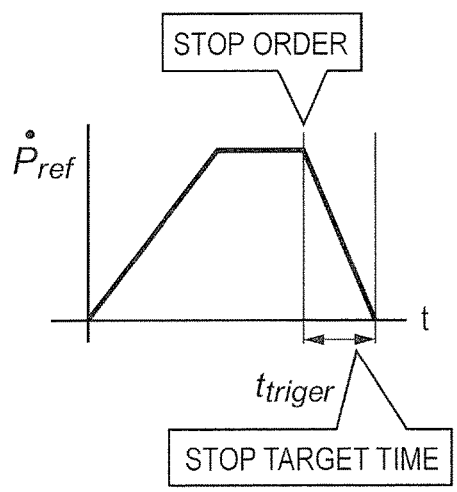
FIGS. 12A, 12B, 12C and 12D are graphs respectively indicating speed target values $P_{ref}(\bullet)$ to time.
Figure 12B:
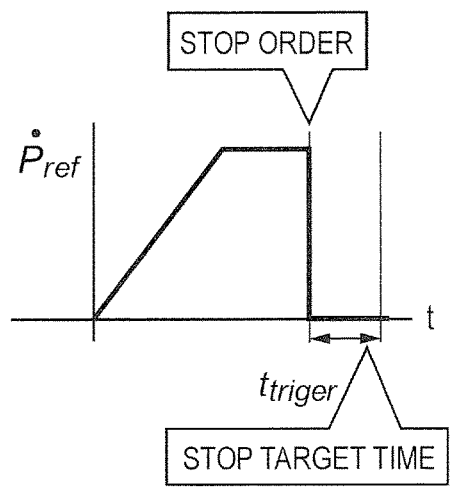
Figure 12C:
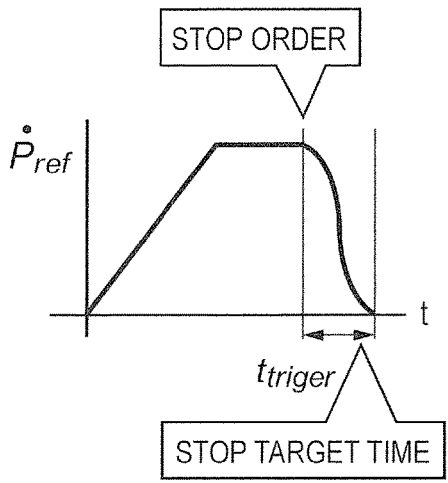
Figure 12D:
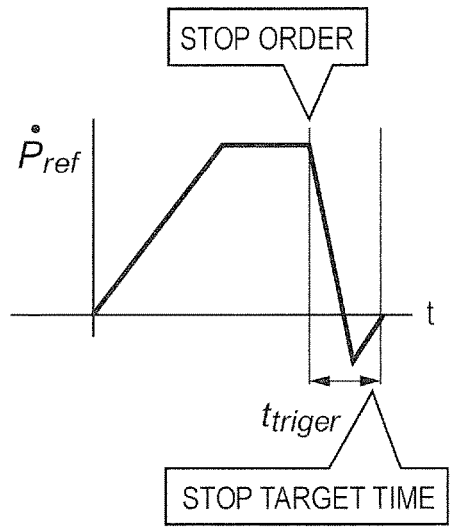

Here, some kinds of decreasing methods are conceivable according to purposes. FIGS. 12A to 12D are graphs respectively indicating the speed target value $P_{ref}(\bullet)$ to time. More specifically, FIG. 12A is the graph indicating the speed target value $P_{ref}(\bullet)$ linearly decreased to time from the time $t_{triger}$ at which the stop order was received, FIG. 12B is the graph indicating the speed target value $P_{ref}(\bullet)$ decreased stepwise to time from the time $t_{triger}$ at which the stop order was received, FIG. 12C is the graph indicating the speed target value $P_{ref}(\bullet)$ nonlinearly decreased to time from the time $t_{triger}$ at which the stop order was received, and FIG. 12D is the graph indicating the speed target value $P_{ref}(\bullet)$ decreased to time while overshooting from the time $t_{triger}$ at which he stop order was received. Although the speed target value $P_{ref}(\bullet)$ is the vector which consists of translation XYZ and rotation XYZ, only one direction is illustrated in FIGS. 12A to 12D for the purpose of simplification.

The speed target value $P_{ref}(\bullet)$ shown in each of FIGS. 12A to 12C is monotonously decreased to time. More specifically, the speed target value $P_{ref}(\bullet)$ shown in FIG. 12A is linearly decreased. The speed target value $P_{ref}(\bullet)$ shown in FIG. 12B is instantaneously switched to "0" at the time $t_{triger}$ of the stop order, and this value is used when the operator wishes to reduce speed earlier than the case where the speed target value shown in FIG. 12A is used. For example, this value can be used when the speed at the time of the stop order is slow (low), or when the operator wishes to stop the robot as soon as possible in the state that the workpiece W1 is not in contact with the workpiece W2.

The speed target value $P_{ref}(\bullet)$ shown in FIG. 12C is nonlinearly decreased, and this value can be used when it intends to make the movements at the time of speed reduction start and at the time of speed reduction completion smooth as compared with the case shown in FIG. 12A. For example, this value can be used when the operator wishes to stop the robot without adding a load any more. The speed target value $P_{ref}(\bullet)$ shown in FIG. 12D is obtained by once waving the value to the side opposite to "0" and then converging the waved value to "0" while taking into account the overshoot of the position. By using this value, it is possible to reduce the speed and stop the robot more quickly. Incidentally, the shown methods of decreasing the speed target value are merely examples, and the present invention is not limited to these methods. Besides, although the case of decreasing the speed target value $P_{ref}(\bullet)$ to 0 is described in the present embodiment, the present invention is not limited to this. For example, it may be possible to decrease the speed target value $P_{ref}(\bullet)$ to a value close to 0.

As described above, according to the second embodiment, in the case where the CPU 301 receives the stop order for stopping the robot in the middle of the force control, the CPU stops the robot 200 while maintaining the force control, by decreasing the force target value and further decreasing the speed target value. For this reason, it is possible to stop the robot 200 such that the workpiece W1 being in contact with the workpiece W2 follows the workpiece W2. Thus, it is possible to stop the robot 200 without adding an excessive load to the robot 200 and the workpieces W1 and W2. In addition, according to the present embodiment, since the workpieces to be handled are not mutually caught (or seized) each other, it is possible to easily return or restore the operation of the robot after the robot was once stopped.

[Modified Example 1]

In the first embodiment, the position target value $P_{ref}$ is fixed in the stopping process of stopping the robot. On the other hand, in the second embodiment, the speed target value $P_{ref}(\bullet)$ is decreased in the stopping process of stopping the robot. It should be noted that such operations may be combined with each other. More specifically, in this case, the speed reduction parameter setting unit 602 fixes (holds) the position target value $P_{ref}$ to the fixed value $P(t_{triger})$ while decreasing the force target value $F_{ref}$ after the time $t_{triger}$ at which the stop order was received, thereby decreasing the speed target value $P_{ref}(\bullet)$. Incidentally, it should be noted that the method of fixing the position target value and the method of decreasing the force target value are the same as those described in the first embodiment, and the method of decreasing the speed target value is the same as that described in the second embodiment.

In this modified example, since the three parameters, that is, the force target value, the position target value and the speed target value, are changed simultaneously, it is possible to decelerate and stop the robot 200 in a short time as compared with the first embodiment and the second embodiment.

[Third Embodiment]

Subsequently, the robot apparatus according to the third embodiment of the present invention will be described. In the third embodiment, the speed reduction parameter setting unit 602 of FIG. 7 described in the first embodiment decreases the force target value $F_{ref}$ and fixes the position target value $P_{ref}$, and further decreases the stiffness coefficient $K_{ref}$ given from the force teaching data 501 described with reference to FIG. 3. That is, the stiffness coefficient $K_{ref}$ of the robot 200 is equivalent to the member (term) which depends on time such as $K_{ref}=K_{ref}(t)$ after the time $t_{triger}$ at which the stop order was received.

According to the workpiece to be assembled and/or the method of assembling, there is a case where the stiffness coefficient $K_{ref}$ is set high.

In the third embodiment, in a case where the position target value $P_{ref}$ is set as the fixed value in the stopping process (stopping step), the speed reduction parameter setting unit 602 decreases the stiffness coefficient $K_{ref}$ of the robot 200. Thus, by decreasing the stiffness coefficient $K_{ref}$, the workpiece W1 flexibly follows the workpiece W2 as compared with the case described in the first embodiment. For this reason, it is possible to stably stop the robot 200.

Figure 13A:
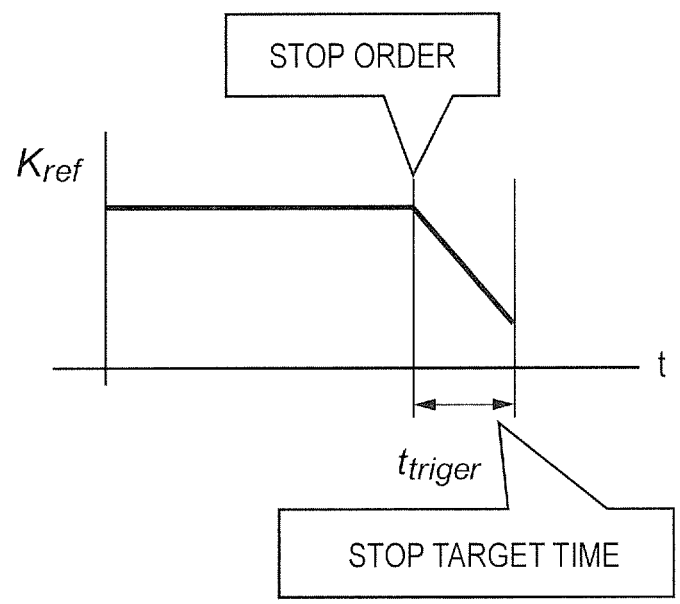
FIGS. 13A and 13B are graphs respectively indicating stiffness coefficients $K_{ref}$ to time.
Figure 13B:
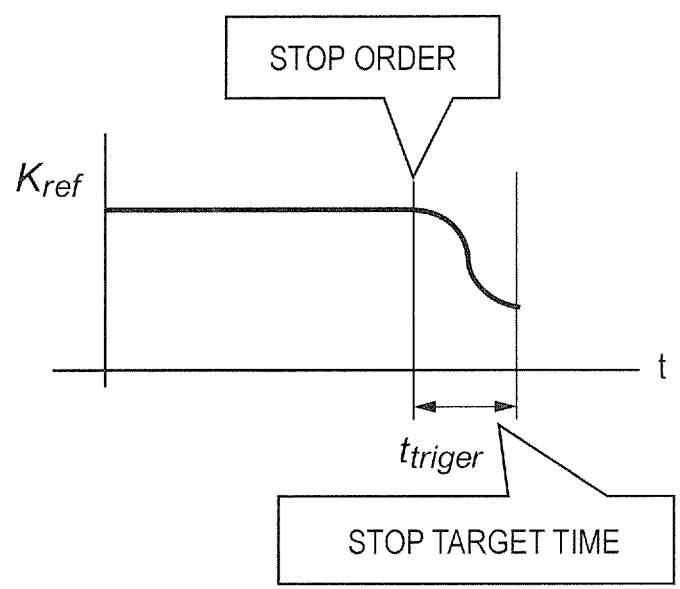

Here, some kinds of methods of decreasing the stiffness coefficient are conceivable according to purposes. FIGS. 13A and 13B are graphs respectively indicating the stiffness coefficient $K_{ref}$ to time. More specifically, FIG. 13A is the graph indicating the stiffness coefficient $K_{ref}$ linearly decreased to time from the time $t_{triger}$ at which the stop order was received, and FIG. 13B is the graph indicating the stiffness coefficient $K_{ref}$ nonlinearly decreased to time from the time $t_{triger}$ at which the stop order was received. Here, although the stiffness coefficient $K_{ref}$ is composed by the matrix, only one component of the relevant matrix is shown for the purpose of a simplified description.

The stiffness coefficient $K_{ref}$ shown in each of FIGS. 13A and 13B is monotonously decreased to time. More specifically, the stiffness coefficient $K_{ref}$ shown in FIG. 13A is linearly decreased to time. On the other hand, the stiffness coefficient $K_{ref}$ shown in FIG. 13B is nonlinearly decreased to time, and this coefficient is used in a case where it intends to make the movement of the robot at the speed reduction start time and the speed reduction completion time smooth as compared with the case where the stiffness coefficient $K_{ref}$ is linearly decreased to time. For example, this coefficient is used in a case where it intends to stop the robot 200 with a lesser load to be added.

Incidentally, the shown methods of decreasing the stiffness coefficient are merely examples. Namely, the present invention is not limited only to these methods. In any case, it may be possible to decrease the whole of the matrix of the stiffness coefficient. Alternatively, it may be possible to decrease only the component of the matrix of the stiffness coefficient related to a desired direction according to an operation of the robot.

As just described, according to the third embodiment, when the stop order is received by the CPU 301 in the middle of the force control, the CPU stops the robot 200 while maintaining the force control by changing the force target value, the position target value and the stiffness coefficient. For this reason, it is possible to stop the robot 200 so as to follow the workpiece W2 which is being in contact with the workpiece W1. Moreover, as compared with the case where the stiffness coefficient is not decreased, it is possible for the robot to flexibly follow the workpiece. For this reason, it is possible to stop the robot with a lesser load to be added on the robot and the workpiece. In addition, according to the present embodiment, since the workpieces to be handled are not mutually caught (or seized) each other, it is possible to easily return or restore the operation of the robot after the robot was once stopped.

[Fourth Embodiment]

Subsequently, the robot apparatus according to the fourth embodiment of the present invention will be described. In the fourth embodiment, the speed reduction parameter setting unit 602 of FIG. 7 described in the second embodiment decreases the force target value $F_{ref}$ and the speed target value $P_{ref}(\cdot)$, and further decreases the viscosity coefficient $D_{ref}$ given from the force teaching data 501 described with reference to FIG. 3. That is, the viscosity coefficient $D_{ref}$ of the robot 200 is equivalent to the member (term) which depends on time such as $D_{ref}=D_{ref}(t)$ after the time $t_{triger}$ at which the stop order was received.

According to the workpiece to be assembled and/or the method of assembling, there is a case where the viscosity coefficient $D_{ref}$ is set high.

In the fourth embodiment, in case of decreasing the speed target value $P_{ref}(\cdot)$ in the stopping process (stopping step), the speed reduction parameter setting unit 602 decreases the viscosity coefficient $D_{ref}$ of the robot 200. Thus, by decreasing the viscosity coefficient $D_{ref}$, the robot flexibly follows the workpiece as compared with the case described in the second embodiment. For this reason, it is possible to stably stop the robot 200.

Figure 14A:
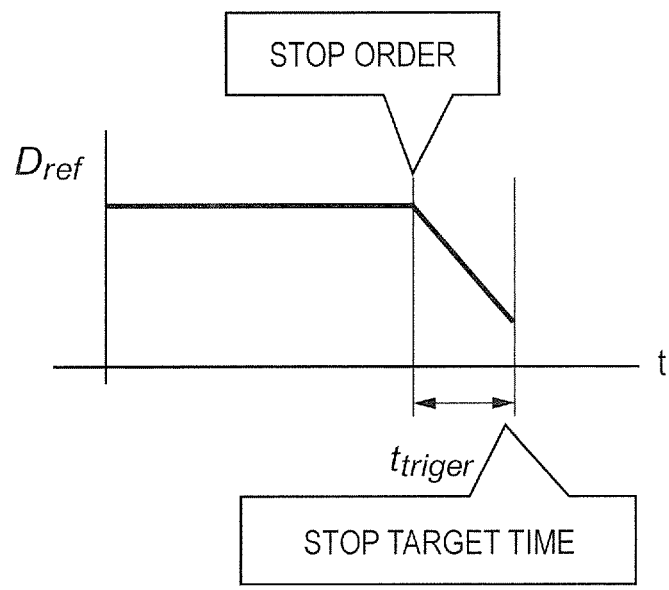
FIGS. 14A and 14B are graphs respectively indicating viscosity coefficients $D_{ref}$ to time.
Figure 14B:
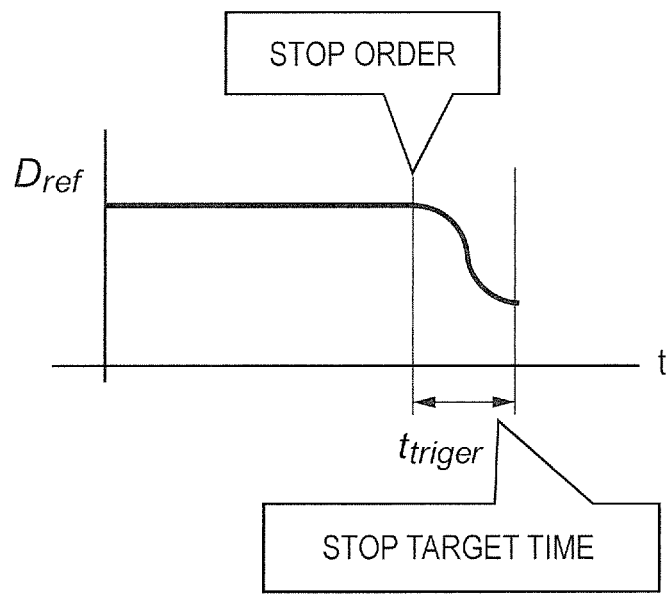

Here, some kinds of methods of decreasing the viscosity coefficient are conceivable according to purposes. FIGS. 14A and 14B are graphs respectively indicating the viscosity coefficient $D_{ref}$ to time. More specifically, FIG. 14A is the graph indicating the viscosity coefficient $D_{ref}$ linearly decreased to time from the time $t_{triger}$ at which the stop order was received, and FIG. 14B is the graph indicating the viscosity coefficient $D_{ref}$ nonlinearly decreased to time from the time $t_{triger}$ at which the stop order was received. Here, although the viscosity coefficient $D_{ref}$ is composed by the matrix, only one component of the relevant matrix is shown for the purpose of a simplified description.

The viscosity coefficient $D_{ref}$ shown in each of FIGS. 14A and 14B is monotonously decreased to time. More specifically, the viscosity coefficient $D_{ref}$ shown in FIG. 14A is linearly decreased to time. On the other hand, the viscosity coefficient $D_{ref}$ shown in FIG. 14B is nonlinearly decreased to time, and this coefficient is used in a case where it intends to make the movement of the robot at the speed reduction start time and the start reduction completion time smooth as compared with the case where the viscosity coefficient $D_{ref}$ is linearly decreased to time. For example, this coefficient is used in a case where it intends to stop the robot 200 with a lesser load to be added.

Incidentally, the shown methods of decreasing the viscosity coefficient are merely examples. Namely, the present invention is not limited only to these methods. In any case, it may be possible to decrease the whole of the matrix of the viscosity coefficient. Alternatively, it may be possible to decrease only the component of the matrix of the viscosity coefficient related to a desired direction according to an operation of the robot.

As just described, according to the fourth embodiment, when the stop order is received by the CPU 301 in the middle of the force control, the CPU stops the robot 200 while maintaining the force control by changing the force target value, the speed target value and the viscosity coefficient. For this reason, it is possible to stop the robot 200 so as to follow the workpiece W2 which is being in contact with the workpiece W1. Moreover, as compared with the case where the viscosity coefficient is not decreased, it is possible for the robot to flexibly follow the workpiece. For this reason, it is possible to stop the robot with a load less to be added on the robot and the workpiece. In addition, according to the present embodiment, since the workpieces are not mutually caught (or seized) each other, it is possible to easily return or restore the operation of the robot after the robot was once stopped.

[Modified Example 2]

The modified example 2 is different from the modified example 1 on the point that the speed reduction parameter setting unit 602 of FIG. 7 decreases the force target value, fixes the position target value and decreases the speed target value, and further decreases the stiffness coefficient and the viscosity coefficient which are given from the force teaching data 501 illustrated in FIG. 3. Incidentally, the method of decreasing the stiffness coefficient is the same as that described in the third embodiment, and the method of decreasing the viscosity coefficient is the same as that described in the fourth embodiment.

In a case where the initial value of each of the stiffness coefficient and the viscosity coefficient has been set high, when the stiffness coefficient and the viscosity coefficient are decreased respectively, the robot 200 follows the workpiece flexibly as compared with the modified example 1. For this reason, it is possible to stably stop the robot.

[Fifth Embodiment]

Figure 15:
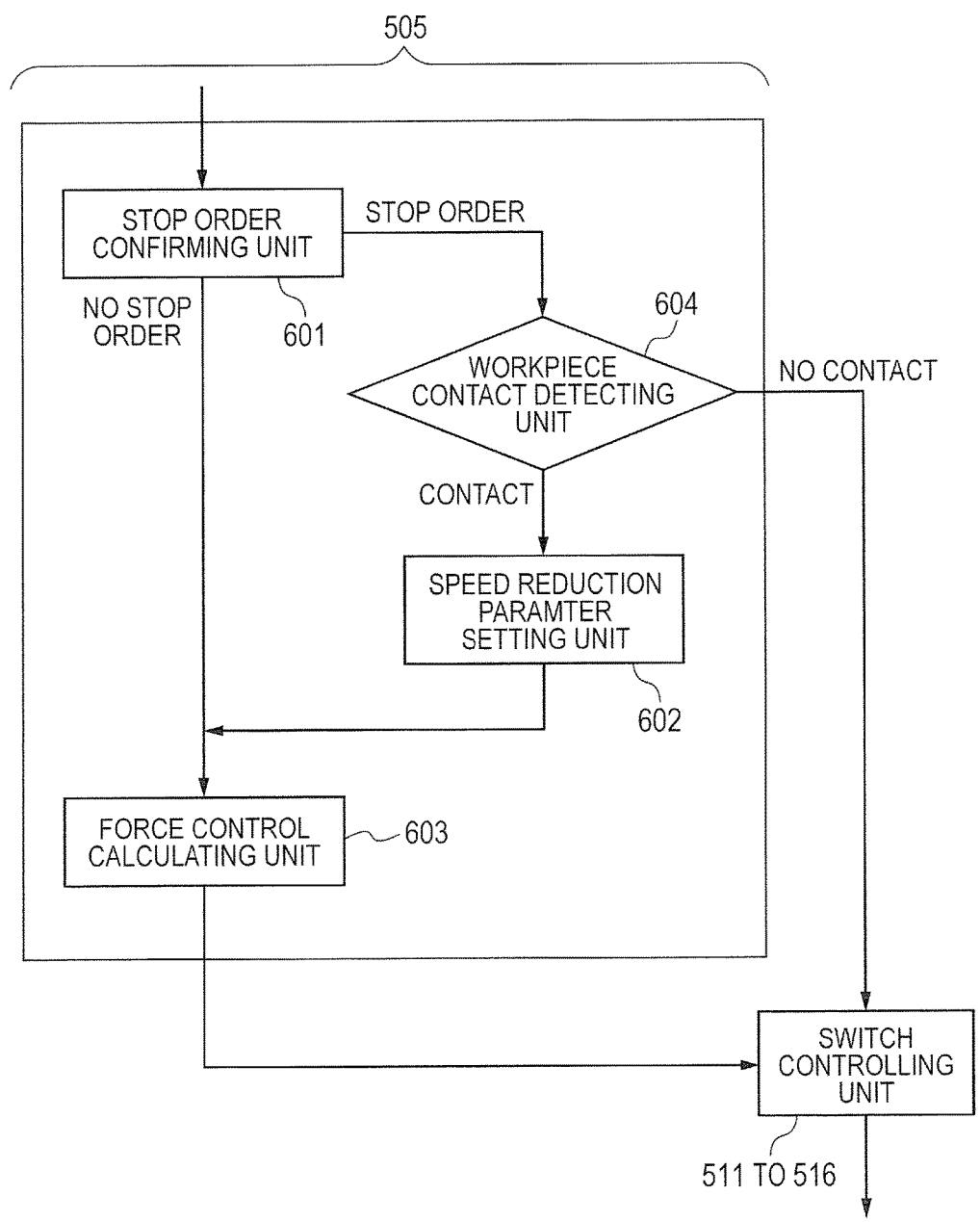
FIG. 15 is a control block diagram for illustrating a control system of a robot apparatus according to the third embodiment.

Subsequently, the robot apparatus according to the fifth embodiment of the present invention will be described. In the fifth embodiment, a workpiece contact detecting unit 604 is provided between the stop order confirming unit 601 and the speed reduction parameter setting unit 602 of FIG. 7 described in the first embodiment, as illustrated in FIG. 15.

By using a sensor for obtaining force acting on a hand tip, the workpiece contact detecting unit 604 obtains the force which acts on the hand tip. As described in the first embodiment, the sensor for obtaining the force acting on the hand tip is equivalent to the plurality of torque sensors for respectively detecting and obtaining the torques of the respective joints. That is, the force detecting unit 504 calculates the current position P(t) of the hand tip of the robot 200 and the hand tip force F of the robot 200 at that time, by using the torques $\tau_1$ to $\tau_6$ respectively detected by the torque sensors 541 to 546 and the angles $q_1$ to $q_6$ respectively detected by the angle sensors 551 to 556. Otherwise, it may be possible to calculate the hand tip force F of the robot 200 by using a force sensor provided or attached to the hand tip.

Then, the calculated hand tip force F is compared with a predetermined threshold previously stored in a storing unit. In a case where the hand tip force F is equal to or higher than the predetermined threshold, the process is advanced to the speed reduction parameter setting unit. Thus, as described in the above first to fourth embodiments, the robot stops in the state of the force control maintained. That is, the instruction value for each motor is obtained such that the force deviation between the respective values of the plurality of torque sensors and the force target value becomes small.

On the other hand, in a case where the calculated hand tip force F compared is smaller than the predetermined threshold previously stored in the storing unit, when the workpiece contact detecting unit 604 does not detect that the robot is in contact with the workpiece, the control is switched from the force control to the position control by the switch controlling units 511 to 516, and then the robot stops. That is, the instruction value for each motor is obtained such that the respective values of the plurality of sensors respectively detecting the positions of the motors or the joints become predetermined values respectively.

Here, it is assumed that it intends to stop the robot in the force control before the robot comes into contact with the workpiece. In such a case, the workpiece which the robot should follow does not exist accordingly. For this reason, there is a possibility that the robot cannot stop until it comes into contact with the workpiece. Even in such a case where the robot is not in contact with the workpiece, it is possible to quickly stop the robot by switching the force control to the position control.

Figure 16:
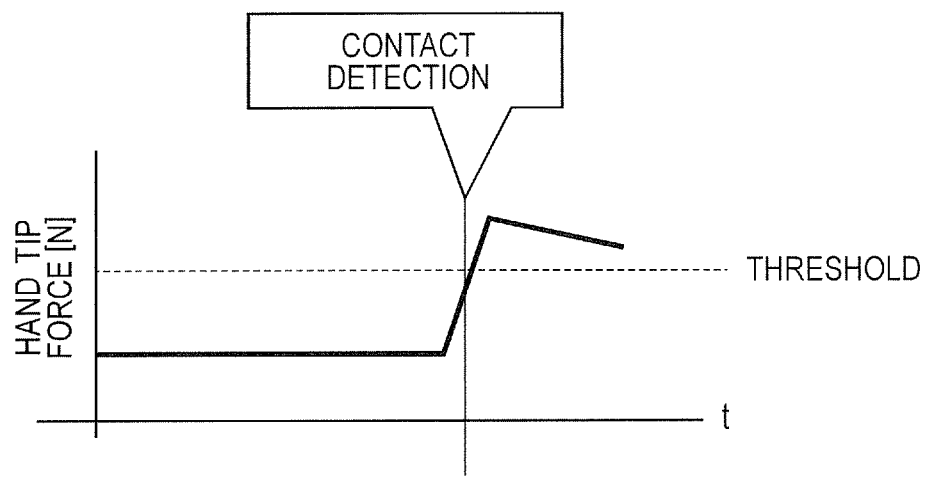
FIG. 16 is a graph indicating a change of hand tip force F to time in a case where a robot is in contact with a workpiece.

FIG. 16 is a graph indicating a change of the hand tip force F to time in the case where the robot is in contact with the workpiece. Although the hand tip force is the vector which consists of translation XYZ and rotation XYZ, only one direction is illustrated for the purpose of simplification.

It is detected whether or not the robot is in contact with the workpiece, by deciding whether or not the hand tip force F exceeds a threshold previously set to the relevant workpiece. Incidentally, the contact detection using the threshold as shown in FIG. 16 is merely an example, and the present invention is not limited to this. For example, it may be possible to perform the contact detection using a threshold decision based on a change rate of the hand tip force.

As described above, according to the fifth embodiment of the present invention, when the stop order is received by the CPU 301 in the middle of the force control and it is decided that the robot is not in contact with the workpiece, the robot is stopped by switching the control from the force control to the position control. For this reason, it is possible to stop the robot quickly as compared with the case where the robot is stopped in the force control.

Incidentally, it should be noted that the present invention is not limited to the above embodiments. That is, various kinds of modifications can be achieved within the range of the technical idea of the present invention. Besides, it should be noted that the effects described in the above embodiments are merely the recitations of the most preferable effects derived from the present invention. That is, the effects derived from the present invention are not limited to them.

It should be noted that the present invention can be achieved also by a process in which a program for achieving one or more functions of the above embodiments is supplied to a system or an apparatus via a network or a storage medium and then one or more processors provided in the computer of the relevant system or the relevant apparatus read out and execute the supplied program. Besides, it should be noted that the present invention can be achieved by a circuit (for example, an ASIC (application specific integrated circuit)) which achieves one or more functions of the above embodiments.

Besides, in the above embodiments, the robot 200 (the robot arm 251) is the vertical multi-joint robot. However, the present invention is not limited to this. That is, as the robot, it may be possible to use various kinds of robots such as a horizontal multi-joint robot, a parallel link robot, an orthogonal robot, and the like. In other words, the driving direction of the joint is not limited to the rotation direction. Namely, the driving direction of the joint includes a linear-motion direction (expansion-and-contraction (stretching) direction). Besides, in the above embodiments, the joint is driven by the electric motor. However, the present invention is not limited to this. Namely, it may be possible to drive the joint by, for example, an artificial muscle or the like.

Besides, in the above embodiments, the robot has the six joints. However, in the present invention, the number of the joints to be used is not limited to this.

Besides, in the above embodiments, the force detecting unit is constituted by the plurality of torque sensors. However, the present invention is not limited to this. Namely, it may be possible to constitute the force detecting unit by a force sensor which is provided at the tip of the robot arm.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-183957, filed Sep. 17, 2015, and Japanese Patent Application No. 2016-172261, filed Sep. 2, 2016, which are hereby incorporated by reference herein in their entirety.

What is claimed is:

1. A robot apparatus comprising:
a robot comprising a plurality of motors configured to drive respective joints, a sensor configured to obtain force acting on a hand tip, and a sensor configured to obtain a position of the hand tip; and
a controlling unit configured to:
output a respective torque instruction value to each of the motors such that the force acting on the hand tip becomes a force target value,
control driving of each of the motors based on the respective torque instruction value, and
in a case where a stop order for stopping the robot is received in a stopping process, set the force target value to a decreased force target value, set as a position target value the position of the hand tip at the time when the stop order is received, and output the respective torque instruction value to each of the motors such that the force acting on the hand tip becomes the decreased force target value and the position of the hand tip becomes the position target value.

2. The robot apparatus according to claim 1, wherein, in the case of setting the position target value to the position of the hand tip at the time when the stop order is received in the stopping process, the controlling unit is configured to decrease a stiffness coefficient of the robot.

3. The robot apparatus according to claim 1, wherein the sensor configured to obtain the position of the hand tip includes a plurality of sensors configured to detect respective positions of the motors or respective positions of the joints.

4. The robot apparatus according to claim 1, wherein:
the controlling unit is configured to obtain a speed of the hand tip from a value of the sensor configured to obtain the position of the hand tip, and
in the stopping process, the controlling unit is configured to set to decrease a speed target value of the hand tip, and output the torque instruction value such that the speed of the hand tip becomes the speed target value.

5. The robot apparatus according to claim 1, wherein:
the robot further comprises a sensor configured to obtain a speed of the hand tip, and
in the stopping process, the controlling unit is configured to set to decrease a speed target value of the hand tip, and output the torque instruction value such that the speed of the hand tip becomes the speed target value.

6. The robot apparatus according to claim 4, wherein, in the case of decreasing the speed target value in the stopping process, the controlling unit is configured to decrease a viscosity coefficient of the robot.

7. The robot apparatus according to claim 1, wherein the robot further comprises a brake configured to brake each of the joints, and
the controlling unit is configured to fix each of the joints of the robot by the brake, after the robot is stopped in the stopping process.

8. The robot apparatus according to claim 1, wherein the controlling unit is further configured to obtain the force acting on the hand tip from values of a torque sensor for obtaining a torque of each of the joints.

9. The robot apparatus according to claim 1, further comprising a teaching pendant having a stop order confirming unit configured to transmit the stop order to the controlling unit.

10. A controlling method of a robot which comprises a plurality of joints, a plurality of motors configured to drive the respective joints, a sensor configured to obtain force acting on a hand tip, and a sensor configured to obtain a position of the hand tip, the controlling method comprising:
outputting a respective torque instruction value to each of the motors such that the force acting on the hand tip becomes a force target value, and
controlling driving of each of the motors based on the respective torque instruction value,
wherein, in a case where a stop order to stop the robot is received, the force target value is set to a decreased force target value, the position of the hand tip at the time when the stop order is received is set as a position target value, and the respective torque instruction value is output to each of the motors such that the force acting on the hand tip becomes the decreased force target value and the position of the hand tip becomes the position target value.

11. A non-transitory computer-readable recording medium on which a program is stored for controlling a robot which comprises a plurality of joints, a plurality of motors configured to drive the respective joints, a sensor configured to obtain forceacting on a hand tip, and a sensor configured to obtain a position of the hand tip, wherein the program comprises code to execute:
outputting a respective torque instruction value to each of the motors such that the force acting on the hand tip becomes a force target value; and
controlling driving of each of the motors based on the respective torque instruction value, and
wherein, in a case where a stop order to stop the robot is received, the program executes:
setting the force target value to a decreased force target value, and setting as a position target value to the position of the hand tip at the time when the stop order is received, and
outputting the respective torque instruction value to each of the motors such that the force acting on the hand tip becomes the decreased force target value and the position of the hand tip becomes the position target value.

* * * * *